(12) United States Patent
Deng et al.

(10) Patent No.: US 12,417,553 B2
(45) Date of Patent: Sep. 16, 2025

(54) DETERMINING AN OBJECT'S 3D ORIENTATION FROM A SINGLE CAMERA'S IMAGE

(71) Applicant: Microsoft Technology Licensing, LLC, Redmond, WA (US)

(72) Inventors: Hongli Deng, Bellevue, WA (US); Ryan Savio Menezes, Bellevue, WA (US); Gabriel Blanco Saldana, Kirkland, WA (US); Zicheng Liu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 714 days.

(21) Appl. No.: 17/739,902

(22) Filed: May 9, 2022

(65) Prior Publication Data

US 2022/0335646 A1  Oct. 20, 2022

Related U.S. Application Data

(63) Continuation of application No. 16/904,507, filed on Jun. 17, 2020, now Pat. No. 11,341,674.

(51) Int. Cl.
| | |
|---|---|
| *G06T 7/73* | (2017.01) |
| *G06V 10/25* | (2022.01) |
| *G06V 10/26* | (2022.01) |
| *G06V 10/75* | (2022.01) |
| *G06V 20/64* | (2022.01) |
| *G06V 40/10* | (2022.01) |
| *H04N 23/67* | (2023.01) |

(52) U.S. Cl.
CPC ............... *G06T 7/75* (2017.01); *G06T 7/73* (2017.01); *G06V 10/25* (2022.01); *G06V 10/26* (2022.01); *G06V 10/75* (2022.01); *G06V 20/647* (2022.01); *G06V 40/10* (2022.01); *H04N 23/675* (2023.01)

(58) Field of Classification Search
CPC .. G06T 7/75; G06T 7/73; G06V 10/25; G06V 10/26; G06V 10/75; G06V 20/647; G06V 40/10; H04N 23/675
See application file for complete search history.

(56) References Cited

U.S. PATENT DOCUMENTS

| | | | |
|---|---|---|---|
| 2003/0169907 A1* | 9/2003 | Edwards | G06V 40/18 382/118 |
| 2019/0333267 A1* | 10/2019 | Black | G06F 18/2321 |
| 2021/0165999 A1* | 6/2021 | Mirbach | G06T 7/75 |

FOREIGN PATENT DOCUMENTS

| | | | | |
|---|---|---|---|---|
| JP | 2009246799 A | * | 10/2009 | |
| WO | WO-2019020704 A1 | * | 1/2019 | ......... G06K 9/00208 |

* cited by examiner

*Primary Examiner* — Casey L Kretzer
(74) *Attorney, Agent, or Firm* — Workman Nydegger

(57) ABSTRACT

Improved techniques for determining an object's 3D orientation. An image is analyzed to identify a 2D object and a first set of key points. The first set defines a first polygon. A 3D virtual object is generated. This 3D virtual object has a second set of key points defining a second polygon representing an orientation of the 3D virtual object. The second polygon is rotated a selected number of times. For each rotation, each rotated polygon is reprojected into 2D space, and a matching score is determined between each reprojected polygon and the first polygon. A specific reprojected polygon is selected whose corresponding matching score is lowest. The orientation of the 3D virtual object is set to an orientation corresponding to the specific reprojected polygon. Based on the orientation of the 3D virtual object, an area of focus of the 2D object is determined.

20 Claims, 18 Drawing Sheets

DETERMINING AN OBJECT'S 3D ORIENTATION FROM A SINGLE CAMERA'S IMAGE

CROSS-REFERENCE TO RELATED APPLICATIONS

This application is a continuation of U.S. patent application Ser. No. 16/904,507 filed on Jun. 17, 2020, entitled "DETERMINING AN OBJECT'S 3D ORIENTATION FROM A SINGLE CAMERA'S IMAGE," which application is expressly incorporated herein by reference in its entirety.

BACKGROUND

Video monitoring is used in a plethora of different scenarios. For instance, video monitoring is used in traffic monitoring scenarios, in retail, in banking, and in numerous other situations. Often, these video monitoring systems rely on one or more cameras that are mounted to a fixed position and aimed in a manner to enable the camera's field of view (FOV) to cover a large area for monitoring purposes.

It is often highly beneficial to transform the events occurring in the two-dimensional (2D) image plane into the three-dimensional (3D) plane. For instance, consider a person crossing a road, or a vehicle entering an area, or a person perusing a retail store. Deducing these events in 3D space typically provides a more accurate and robust understanding of what actions are actually occurring as compared to trying to interpolate those actions in 2D space.

Numerous techniques are available to transform 2D data into 3D data. For instance, a time of flight (ToF) range finder may be used to determine depths, which can then be used to interpret the 2D images captured by a camera. Similarly, stereoscopic depth matching can also be performed when two cameras are used to cover an overlapping field of view. Unfortunately, it is often the case that monitoring systems have only a single camera, or at least only a single camera per geographic area. For instance, a specific portion of a retail store may be covered by only a single camera. As such, the above-described techniques for determining depth (and hence 3D information) are typically not available for monitoring systems. Instead of these other techniques, a calibration process can be performed to calibrate a single camera in order to transform or map the 2D image plane to 3D space.

For instance, some video monitoring and other video analytics applications require their cameras to be calibrated prior to use in order to acquire an accurate mapping between the 2D image plane and 3D space. One example calibration process involves placing an object with a known pattern into the camera's FOV. The camera then captures an image of the pattern and detects distortions of the pattern in the image. The system then compares the distortions in the image to the known characteristics of the pattern. These differences enable the system to determine both extrinsic (e.g., placement, orientation, etc.) and intrinsic (e.g., focal length, camera distortion, etc.) parameters of the camera and enable the system to effectively calibrate the camera by determining the positioning relationship of the camera relative to the environment as well as determining the operational features of the camera. After calibration, the camera system can interpolate distances and other qualities for objects included in newly acquired 2D images.

Once the camera is calibrated, the 2D images produced by that camera can be mapped into 3D space. Doing so enables the system to have a more robust understanding of the events that are being recorded by the camera. Although numerous benefits are achieved by performing these 2D to 3D mappings, there are still numerous challenges that occur. For instance, one challenge relates to the ability to determine where a human is focusing his/her attention. Traditional techniques for monitoring human operations typically involved generating a skeleton representation of the human based on the skeletal joints of the human. One problem with this technique, however, is that while the human's movements can generally be tracked, skeleton tracking fails to enable the system to determine where the human is focusing his/her attention. Determining a human's area of focus is highly beneficial in numerous contexts, such as in the advertising or retail space. By way of example, a retail store places goods at specific locations on a counter or in an aisle. It has been found that certain locations of an aisle result in more sales than when the same good is placed at other locations.

Allowing a monitoring system to monitor where humans are focusing their attentions can significantly help with not only product placement, but in other scenarios as well. Unfortunately, traditional techniques for monitoring human operations are quite deficient when only a single camera is being used, even if that camera is calibrated. Accordingly, there is a substantial need in the field to be able to accurately determine where a human's area of focus is based on images generated by a single camera.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods for determining a three-dimensional (3D) orientation of an object detected in a 2D image.

In some embodiments, an image is segmented, examined, reviewed, or analyzed to identify a two-dimensional (2D) object of a particular type. This segmenting or analyzing process includes identifying a first set of key points of the 2D object. Here, the first set of key points define a first polygon. The embodiments also generate (e.g., in 3D space) a 3D virtual object corresponding to the 2D object. This 3D virtual object is associated with a second set of key points defining a second polygon that represents an orientation of the 3D virtual object in 3D space. The embodiments then rotate (in 3D space) the second polygon a selected number of times. For each rotation of the second polygon in 3D space, each rotated second polygon is reprojected into 2D space and a matching score is determined between each reprojected rotated second polygon and the first polygon. A specific reprojected rotated second polygon is selected whose corresponding matching score is lowest as compared to any other determined matching scores associated with the second polygon. The orientation of the 3D virtual object is then set to an orientation corresponding to the specific reprojected rotated second polygon. Based on the determined orientation of the 3D virtual object, the embodiments are then optionally able to determine an area of focus of the 2D object in 2D space.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
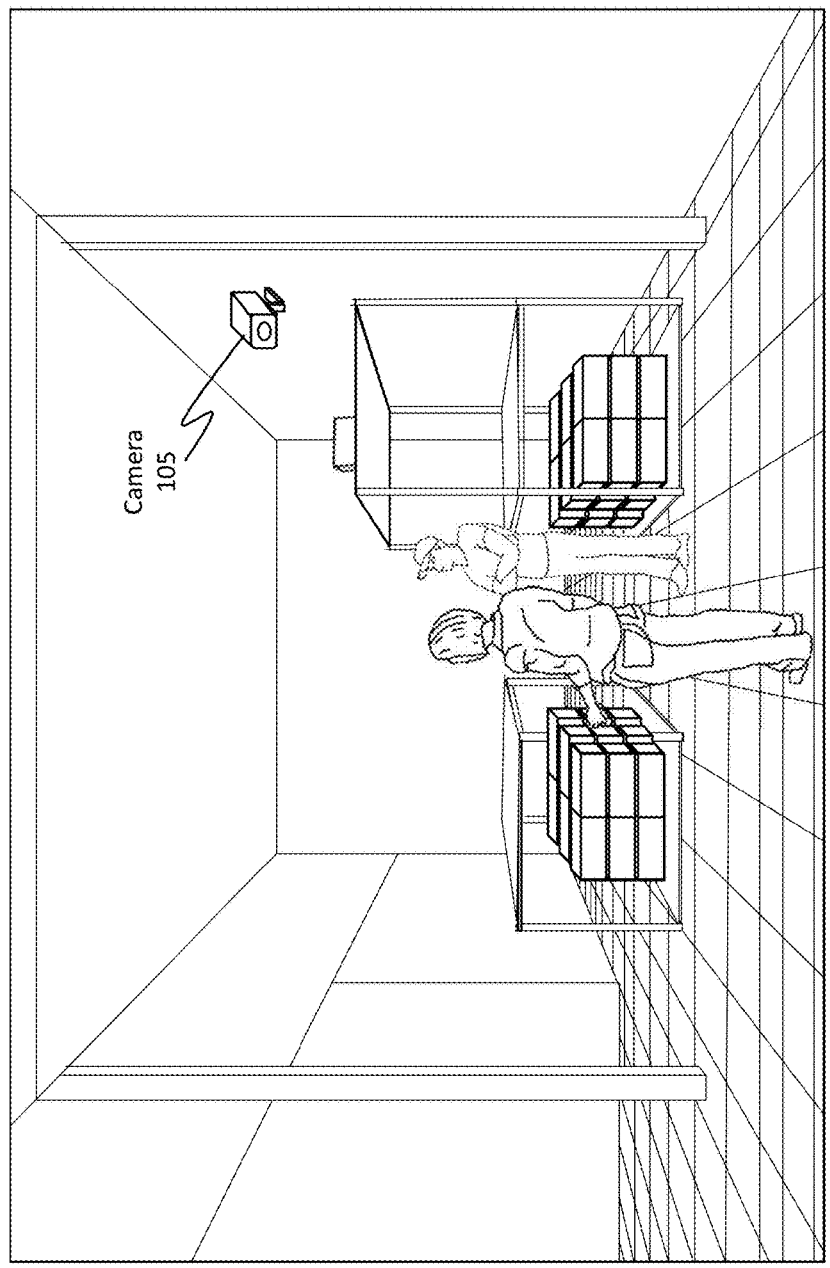
FIG. 1 illustrates an example environment in which a single camera (e.g., perhaps a monitoring camera) is mounted at a fixed position and is configured to monitor the environment.

Embodiments disclosed herein relate to systems, devices, and methods for determining a three-dimensional (3D) orientation of an object detected in a 2D image.

In some embodiments, an image is analyzed, examined, reviewed, or segmented to identify a 2D object of a particular type and by identifying a first set of key points, which define a first polygon. A 3D virtual object is generated. This 3D virtual object has a second set of key points defining a second polygon representing an orientation of the 3D virtual object. The second polygon is rotated in 3D space. For each rotation of the second polygon, each rotated second polygon is reprojected into 2D space and then compared against the first polygon to generate a matching score. A specific reprojected rotated second polygon is selected whose matching score is lowest. The orientation of the 3D virtual object is set to an orientation corresponding to the specific reprojected rotated second polygon. Based on that orientation, an area of focus of the 2D object is then optionally determined.

As used herein, the term "reproject" should be interpreted broadly to include any technique for converting 3D data into 2D data. Example techniques include rasterization (i.e. the process of determining 2D pixel coordinates for 3D objects), ray-tracing, perspective projection, parallel projection, orthographic projection, multiview projection, axonometric projection, dimetric projection, trimetric projection, oblique projection, and so forth.

As used herein, reference to "3D space" does not necessarily mean an entire environment is generated, with an object being placed in that environment. Rather, 3D space should be interpreted broadly to refer to numerous different scenarios, including scenarios involving an expansive 3D environment as well as scenarios in which a single 3D object is generated, irrespective of any surrounding environment. Furthermore, the 3D orientation may be determined relative to a determined gravity vector. The 3D vector may be a 3 degrees of freedom (3DOF) orientation or perhaps even a 6 DOF orientation.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The embodiments provide substantial improvements, benefits, and practical applications to the technical field. By way of example, the disclosed embodiments improve how images are analyzed to determine where an object is directed towards (or aimed) or where a human is focusing his/her attention. Traditional systems failed to be able to perform these operations in a direct manner. Instead, traditional systems required additional compute in order to perform gaze detection. For instance, traditional systems often required the use of specially trained machine learning algorithms, which have increased computational cost and other expenses. Some traditional systems also required the use of depth detection systems in order to determine gaze direction or focus area.

Stated differently, traditional systems required increased computational operations in order to determine gaze or focus area. The disclosed embodiments, on the other hand, are able to determine gaze, or rather area of focus, by analyzing the contents of a 2D image in a special new process. Doing so enables the system to refrain from using more computational expensive components, such as depth detection systems and others. Accordingly, substantial improvements in computing efficiency and compute cost reduction are achieved through the practice of the disclosed principles.

The disclosed principles may be practically applied in numerous different scenarios. For instance, the principles may be practiced in any type of retail environment, banking environment, or any type of environment in which video monitoring is performed. In some cases, the principles may be practiced to help markets or other businesses identify where customers are focusing their attentions or where objects are being faced. By making this determination, the markets are able to perform improved product placement and other merchandise organization. Additional practical applications include the ability to have improved reporting and metric calculations with regard to placing objects in an environment. Yet another application involves potentially identifying areas where humans should be placing their attentions but are not.

For example, the embodiments are able to identify an area that is potentially dangerous and that should be given care. The embodiments are able to identify whether humans are gazing at that dangerous area or whether they are gazing elsewhere. If the humans are distracted and looking elsewhere, then an alarm can be triggered to notify the human that an impending dangerous area is near. Accordingly, numerous benefits, improvements, and practical applications are realized through practice of the disclosed embodiments.

Video Monitoring

Figure 2:
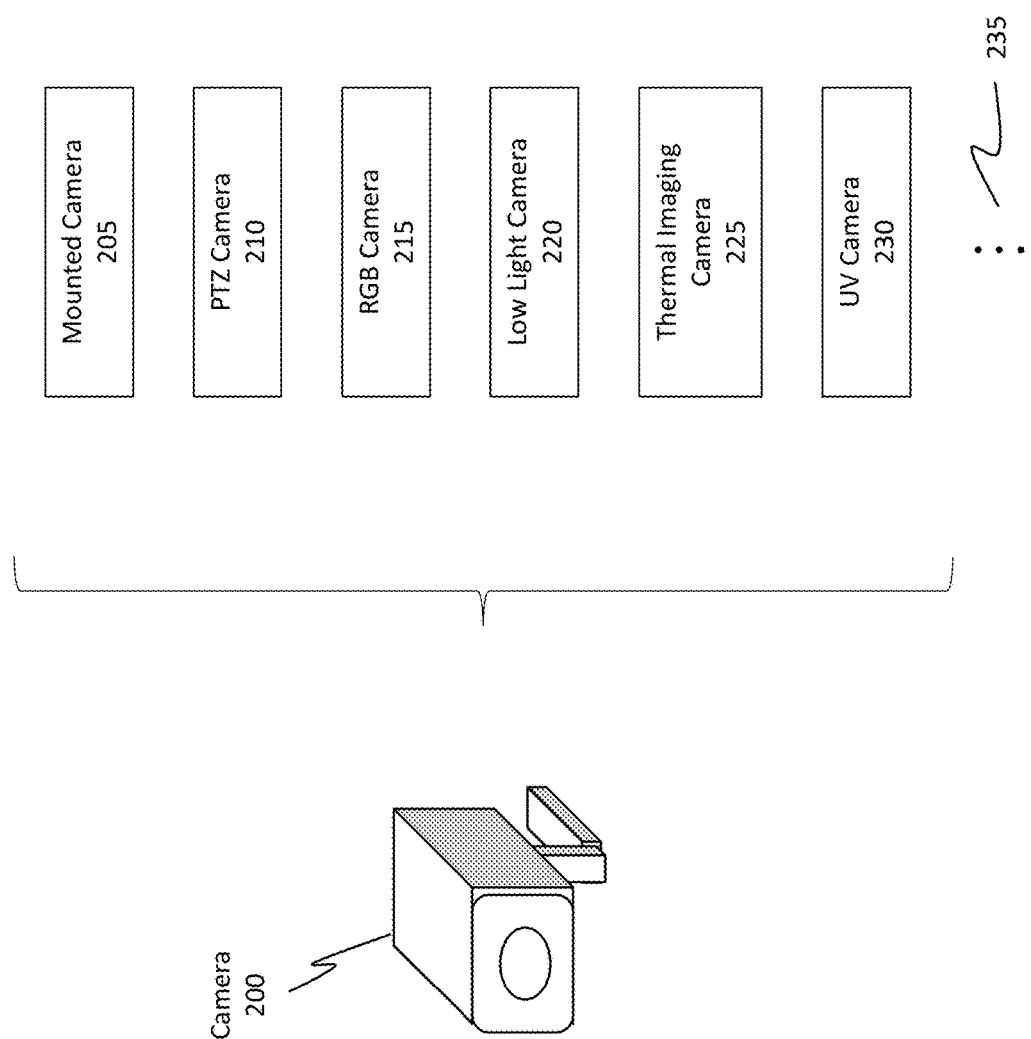
FIG. 2 illustrates how the camera can be structured in numerous different ways.

Attention will now be directed to FIG. 1, which illustrates an example environment 100 in which a camera 105 is positioned. Here, the gravity vector 110 illustrates the direction of gravity relative to the camera 105. Camera 105 is shown as monitoring the environment 100. One will appreciate how environment 100 may be any type of environment, without limit. Examples include, but are not limited to, any type of retail, banking, office, indoor, or outdoor environment. Additionally, camera 105 may be any type of monitoring camera. FIG. 2 illustrates some different camera implementations.

Specifically, FIG. 2 shows a camera 200, which is representative of the camera 105 of FIG. 1. Camera 200 can be embodied in different ways. For instance, camera 205 can be a mounted camera 205 (i.e. a camera mounted to a fixed position in an environment), or a pan, tilt, zoom PTZ camera 210. Camera 200 can also be a red, green, blue RGB camera 215, a low light camera 220, a thermal imaging camera 225, or an ultraviolet UV camera 230. In some cases, the camera 200 is a combination of these camera types (e.g., a PTZ camera that is also a RGB camera, or a low light camera, or a thermal imaging camera, or a UV camera). In some cases, the camera 200 is an oscillating camera that may stop at any number of stop positions in order to generate an image. In some cases, the camera's shutter may be sufficiently fast such that the camera 200 can oscillate without stopping and an image may be generated. Different calibration parameters may be provided for each image capture position or stop position, and those calibration parameters may be used when mapping 2D content into the 3D space.

Generally, a human eye is able to perceive light within the so-called "visible spectrum," which includes light (or rather, electromagnetic radiation) having wavelengths ranging from about 380 nanometers (nm) up to about 740 nm. As used herein, the RGB camera 215 is structured to capture light photons within the visible spectrum. Often, the RGB camera 215 is a complementary metal-oxide-semiconductor (CMOS) type camera, though other camera types may be used as well (e.g., charge coupled devices, CCD). In some embodiments, the RGB camera 215 can capture both visible light and infrared IR light.

The low light camera 220 is structured to capture visible light and IR light. IR light is often segmented into three different classifications, including near-IR, mid-IR, and far-IR (e.g., thermal-IR). The classifications are determined based on the energy of the IR light. By way of example, near-IR has relatively higher energy as a result of having relatively shorter wavelengths (e.g., between about 750 nm and about 1,000 nm). In contrast, far-IR has relatively less energy as a result of having relatively longer wavelengths (e.g., up to about 30,000 nm). Mid-IR has energy values in between or in the middle of the near-IR and far-IR ranges. The low light camera(s) 215 are structured to detect or be sensitive to IR light in at least the near-IR range.

One distinguishing feature between the RGB camera 215 and the low light camera 220 is related to the illuminance conditions or illuminance range(s) in which they actively operate. In some cases, the RGB camera 215 operates in environments where the illuminance is between about 10 lux and about 100,000 lux, or rather, the illuminance range begins at about 10 lux and increases beyond 10 lux. In contrast, the low light camera 220 often operates in environments where the illuminance range is between about 1 milli-lux and about 10 lux.

The thermal imaging camera 225 is structured to detect electromagnetic radiation or IR light in the far-IR (i.e. thermal-IR) range, though some embodiments also enable the thermal imaging camera 225 to detect radiation in the mid-IR range. To clarify, the thermal imaging camera 225 may be a long wave infrared imaging camera structured to detect electromagnetic radiation by measuring long wave infrared wavelengths. Often, the thermal imaging camera 225 detects IR radiation having wavelengths between about 8 microns and 14 microns. Because the thermal imaging camera 225 detects far-IR radiation, the thermal imaging camera 225 can operate in any illuminance condition, without restriction.

The UV camera 230 is structured to capture light in the UV range. The UV range includes electromagnetic radiation having wavelengths between about 10 nm and about 400 nm. The disclosed UV camera 230 should be interpreted broadly and may be operated in a manner that includes both reflected UV photography and UV induced fluorescence photography.

The ellipsis 235 shows how any other type of camera may be used as well, without limit. Accordingly, the disclosed principles may be practiced by any type of camera system.

Figure 3:
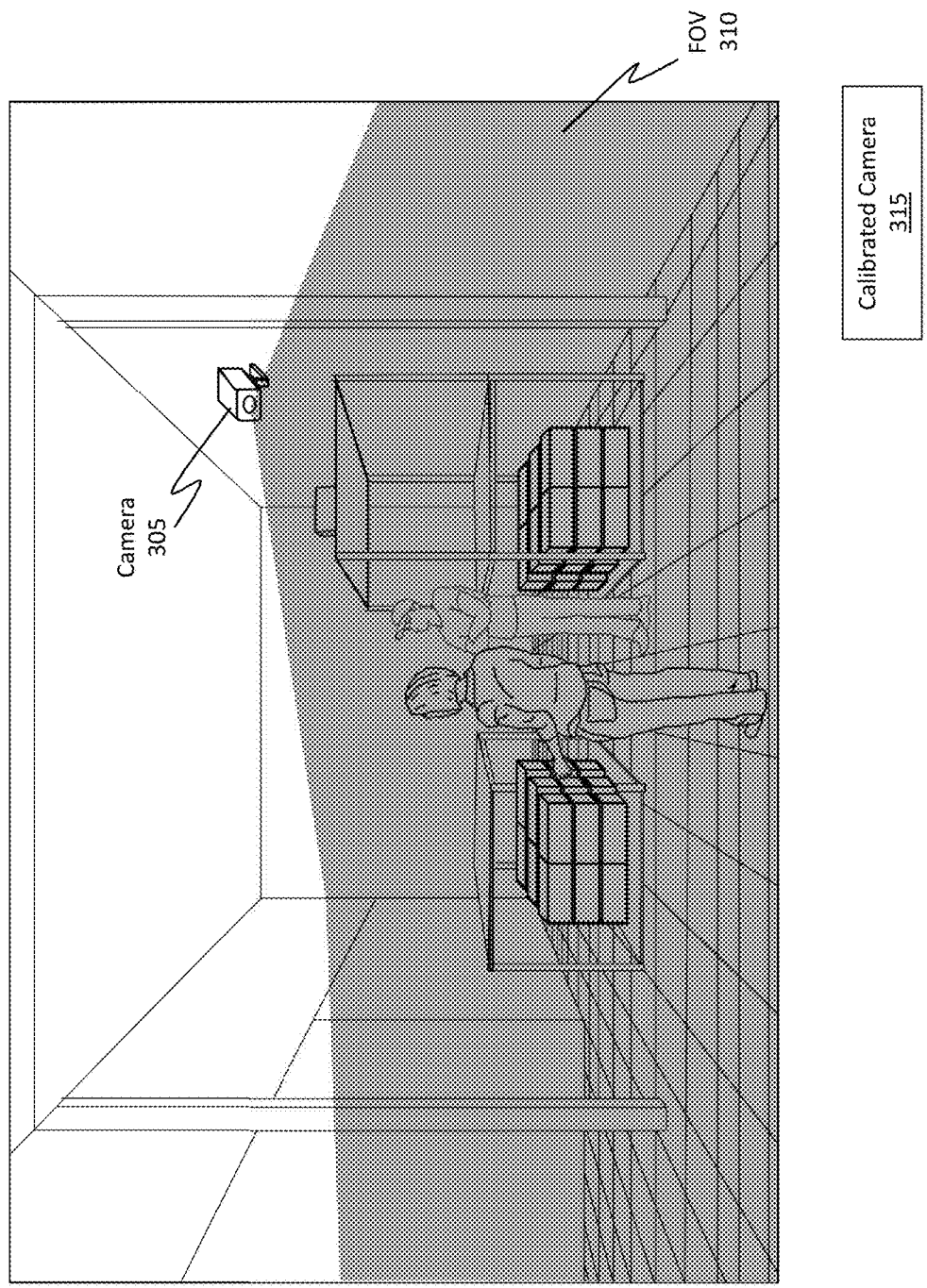
FIG. 3 illustrates how the field of view (FOV) of the camera can capture a wide area of the environment for monitoring purposes.

FIG. 3 shows an environment 300 and a camera 305, both of which are representative of their corresponding illustrations in FIG. 1. Here, however, FIG. 3 shows the field of view FOV 310 of the camera 305. The camera 305, which may be embodied as any of the cameras mentioned in connection with FIG. 2, can have a wide-angle lens, a narrow-angle lens, or any other type of lens configuration.

Camera 305 can be a pinhole camera or any generic type of camera. In any event, the camera 305 captures image content based on its FOV 310, which generally refers to the area that is detected/monitored by the camera 305's sensor(s).

Camera 305 is a calibrated camera 315 that has been calibrated to enable the camera system to map 2D content into 3D space (i.e. map points on a 2D image to 3D space, and vice versa). This calibration may be performed in any manner, without limit. Example calibration techniques include, but are not limited to, using a pattern of known characteristics and then taking an image of that pattern. Distortions in the image of the pattern can then be used to determine both intrinsic and extrinsic parameters of the calibration, thereby enabling the camera to be calibrated. The calibration can also occur automatically by using objects of known characteristics (or average characteristics) to perform the calibration. For instance, a human can be identified in an image and then used to calibrate the camera based on the average characteristics of humans. Vehicles and other objects can be used as well for the calibration. Accordingly, detecting objects having known average characteristics can be used to perform the calibration. In this regard, the disclosed images may be generated by the calibrated camera 315, which is calibrated to determine distances between objects in a 2D image.

Figure 4:
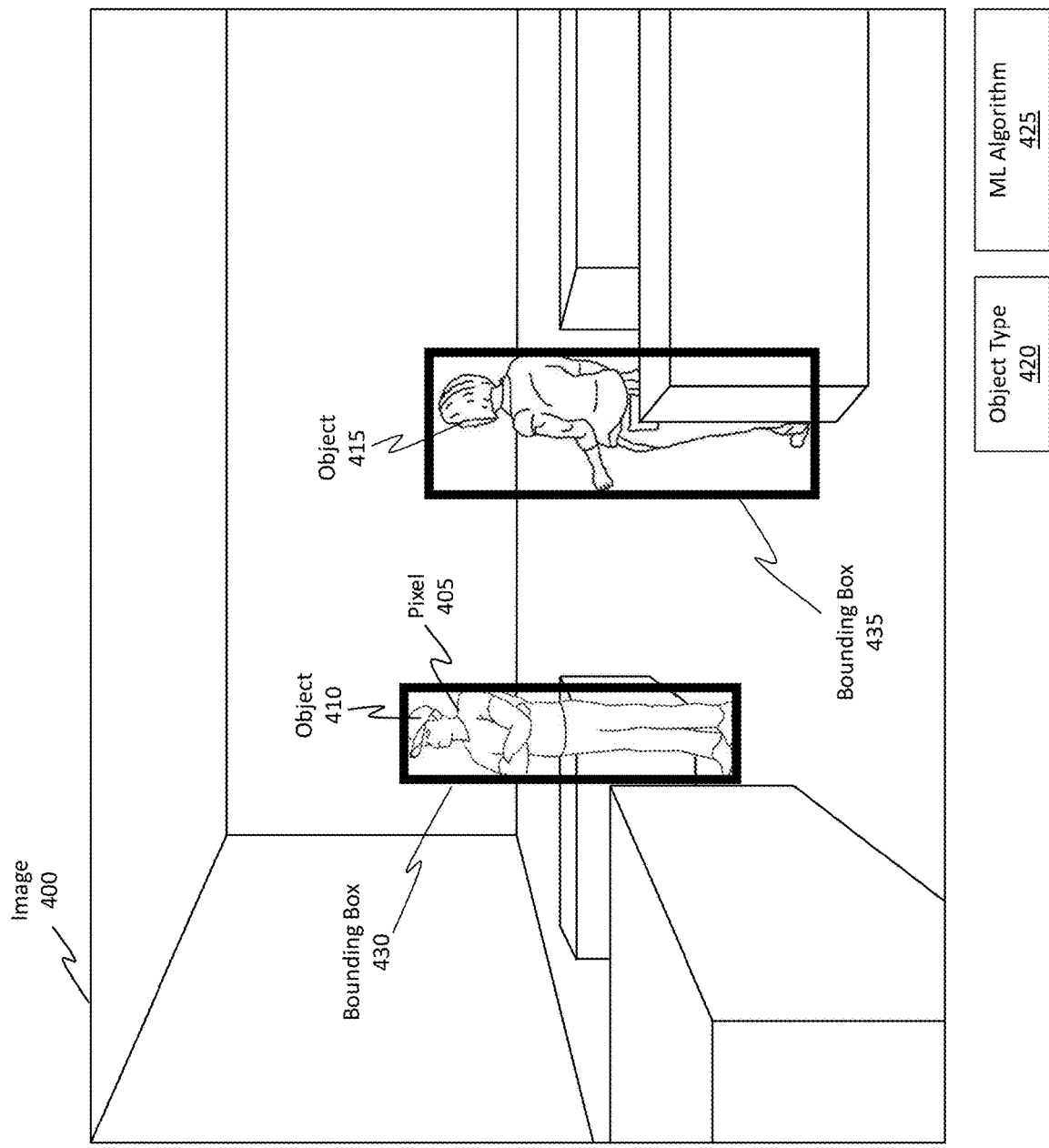
FIG. 4 illustrates an example of an image that may be generated by the camera.

FIG. 4 illustrates an example image 400, which may have been generated by any of the cameras discussed thus far. By way of example and not limitation, image 400 may have been generated by camera 305 of FIG. 3.

Image 400 is comprised of any number of pixels, such as pixel 405. The pixels may be analyzed or segmented to distinguish one pixel from another pixel. For instance, pixel 405 is included in a group of pixels representative of object 410, who is a man wearing a cap. Similarly, a different group of pixels can be detected, analyzed, identified, or segmented and identified as representing the object 415, who is a woman. The analyzing or segmentation process will be discussed in more detail later, but by way of a quick introduction, pixels in an image (e.g., image 400) may be segmented and grouped together to represent identified objects. This segmentation process may be performed via different types of machine learning, which will be discussed in more detail later.

The segmentation process may result in identifying any number of different objects in the image 400. For instance, object 410 is one object and object 415 is a different object. As a part of the segmentation process, the embodiments are able to determine an object type 420 for each object in the image 400. By way of example, the object type 420 for object 410 may be that of a human. Similarly, the object type 420 for object 415 may also be that of a human. A number of tables, or rather planar surfaces, are also illustrated in image 400, though they are not labeled. These planar surfaces may also be segmented and identified, and an object type 420 may be assigned to them as well. Similarly, the walls may be identified and given the object type 420 of a "wall."

The disclosed embodiments are able to use any type of machine learning or machine learning algorithm to segment objects in an image. As used herein, reference to any type of machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

The ML algorithm 425 may be trained to segment, identify, and classify objects in an image. In this case, the ML algorithm 425 has segmented two objects (though more objects may be segmented) and placed bounding boxes around those objects. For instance, the ML algorithm 425 has placed a bounding box 430 around the man with the cap (or rather the pixels representative of the man) (i.e. object 410) and has placed a bounding box 435 around the woman (i.e. object 415). These bounding boxes are generally polygons shaped to entirely encompass the pixels corresponding to an object, though other shapes (e.g., an oval) may also be used. Indeed, any type of polygon or shape may be used, but in this example scenario rectangles are being used.

Notably, the embodiments are able to segment objects even when those objects appear to overlap one another. For instance, the woman's leg (i.e. object 415) is currently behind a counter. Despite part of her leg being occluded, the embodiments are still able to distinguish the woman from the counter and generate the bounding box 435 around the woman.

Figure 5:
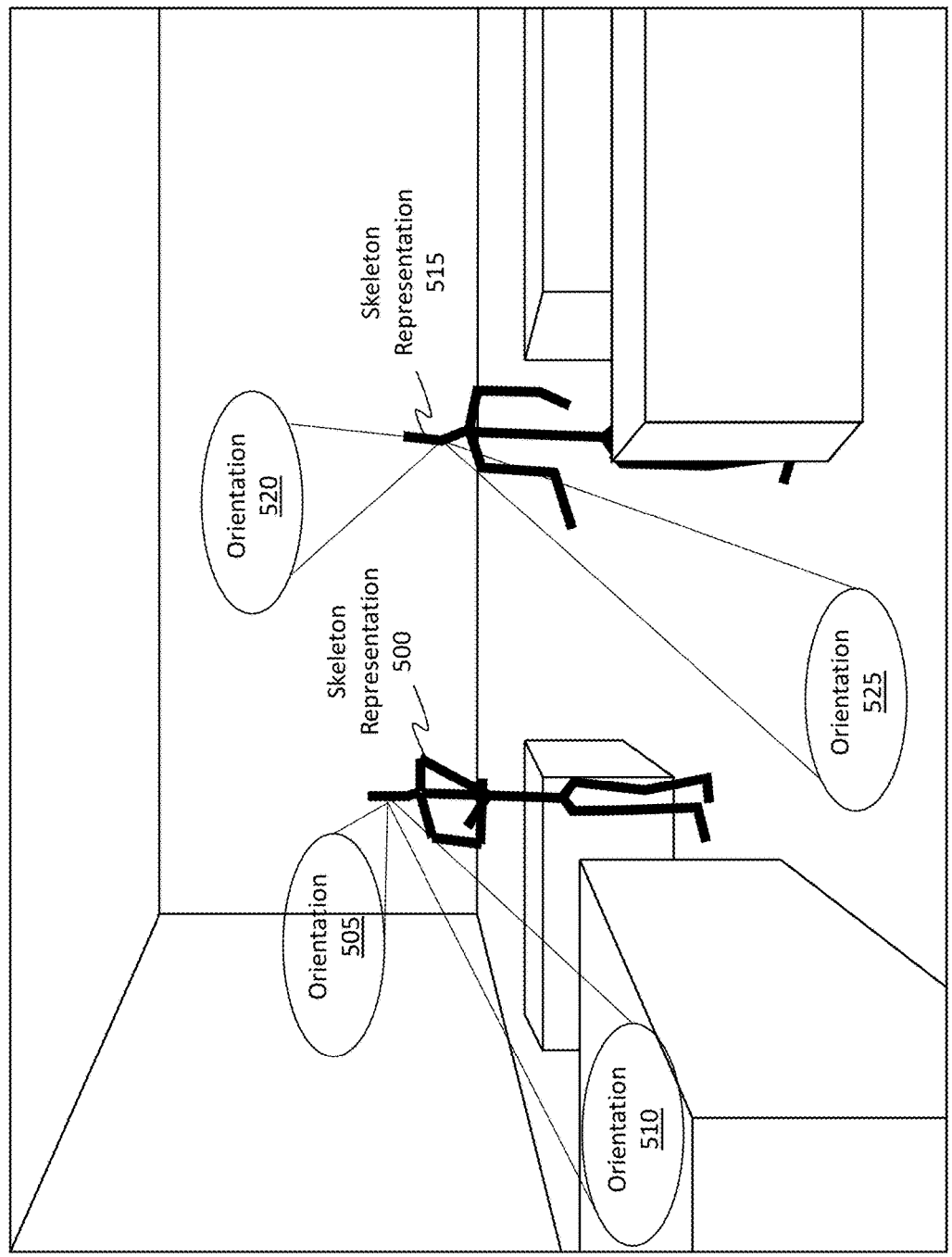
FIG. 5 illustrates how use of skeleton tracking is insufficient to determine where a human's area of focus is located.

FIG. 5 shows an example scenario in which a skeleton representation 500 has been generated for the object 410 from FIG. 4. As used herein, a skeleton representation generally refers to a representation designed to mimic or outline the skeletal joints of a human's body, as detected in an image. For instance, the skeleton representation 500 shows how the human male from FIG. 4 has his arms crossed.

With traditional systems, performing skeletal tracking on a 2D image was insufficient to determine an orientation of the underlying human. For instance, FIG. 5 shows how multiple different orientations of the human could be potentially be the true orientation, as shown by orientation 505 and orientation 510. Similarly, for the skeleton representation 515, which corresponds to object 415 in FIG. 4, there could potentially be multiple orientations of that human, as shown by orientation 520 and orientation 525. In accordance with the disclosed principles, the embodiments are able to generate an accurate determination of a human (or other object's) orientation based on images generated by a single camera. Although a majority of the examples disclosed herein refer to humans, one will appreciate how any object may be identified and segmented and how the disclosed principles may be employed for those objects.

Figure 6:
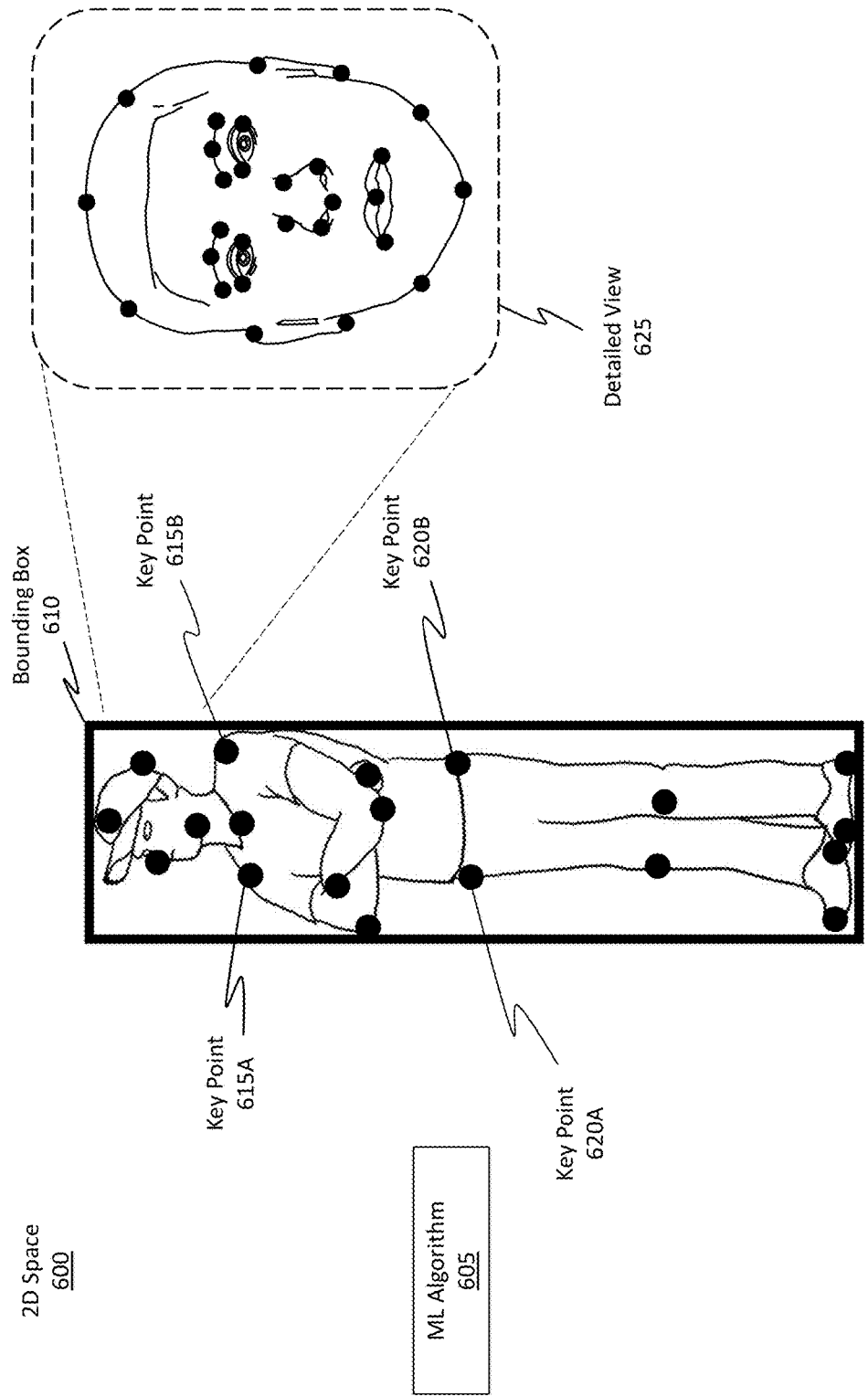
FIG. 6 illustrates how a bounding box may be generated to encompass image pixels corresponding to specific types of objects (e.g., perhaps a human).

FIG. 6 shows a close-up view of the segmented man that was illustrated in FIG. 4. It should be noted how this image is still in the 2D space 600. In other words, the image that was originally generated by the camera system is a 2D image. FIG. 6 also shows the ML algorithm 605, which is representative of the ML algorithm 425 of FIG. 4, and the bounding box 610, which is representative of the bounding box 430.

In addition to segmenting objects and generating bounding boxes, the ML algorithm 605 is also configured to identify so-called "key points" of an object. As used herein, "key points" (aka "interest points") are spatial locations or points included within an image that define the boundaries, contours, geometries, and regions of an object. Key point detection refers to the process of detecting these key points within an image for a particular object. Stated differently, key points refer to the detectable features of an object. In accordance with the disclosed principles, any number of key points may be identified for an object. For instance, 1, 2, 3, 4, 5, 6, 7, 8, 9, 10, 20, 30, 40, 50, 60, 70, 80, 90, 100, 1,000, 2,000, 3,000, 4,000 or more than 4,000 key points may be identified for a single object. FIG. 6 shows a simplified illustration of a number of key points. Accordingly, the ML algorithm 605 segments the image by generating a bounding box around an object and by identifying the set of key points for that object.

FIG. 6 illustrates a key points 615A and 615B corresponding to the man's shoulders and key points 620A and 620B corresponding to the man's hips. Other key points, as represented by the black circles, are illustrated at other locations of the man's body in the 2D space. FIG. 6 also shows a detailed view 625 of the man's face, with corresponding key points. Accordingly, the ML algorithm 605 is able to segment image pixels and group them into objects. The ML algorithm 605 is then able to determine a type for the object (e.g., a human type, a vehicle type, a table type, a counter type, a wall type, etc.). The ML algorithm 605 is further able to identify any number of key points for each object detected in an image.

Generating a Virtual Object

Figure 7:
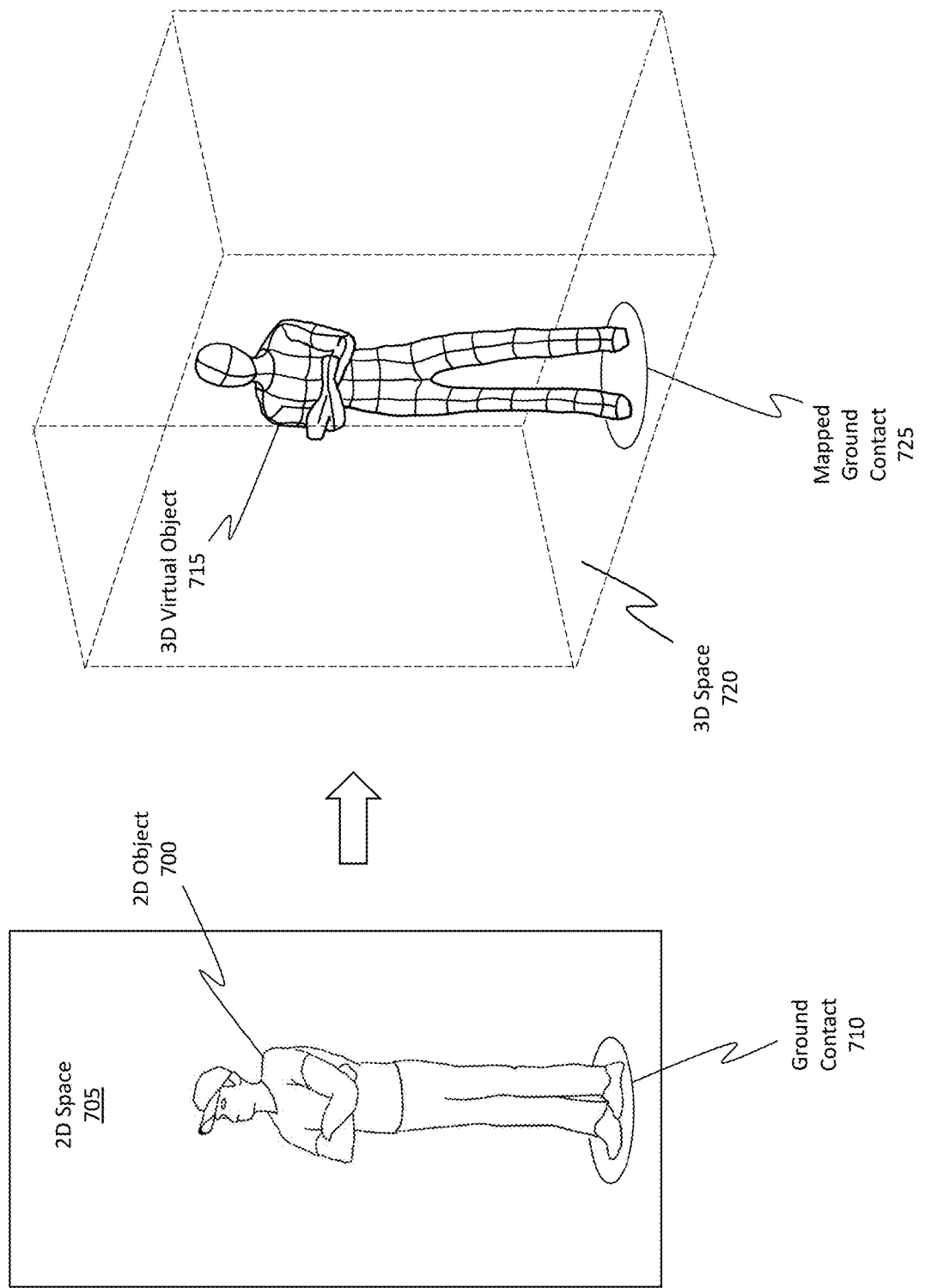
FIG. 7 illustrates an example implementation in which a virtual object is generated in 3D space, where this virtual object is designed to be of the same type as the object detected in the 2D image.

In accordance with the disclosed principles, the embodiments are able to generate a 3D virtual object corresponding to one of the 2D objects detected in an image. FIG. 7 is illustrative of this concept.

Specifically, FIG. 7 shows a 2D object 700, which corresponds to the object 410 of FIG. 4, represented in 2D space 705. Of course, the 2D object 700 may have been any of the objects that were detected by the ML algorithm in the images discussed earlier. The ML algorithm is able to analyze the objects in the image to determine their types and characteristics. The ML algorithm is then able to select specific objects corresponding to selected or specific types.

For instance, the ML algorithm may select objects that are of a human type or objects that are of a vehicle type or even objects that are of a door type. Any type of object may be selected in order to determine its orientation in 3D space. In some cases, the ML algorithm may filter from consideration object types that are not selected. For instance, the ML algorithm may determine that only human type objects are to be worked with. In this regard, objects that are identified as not being of a selected type (e.g., perhaps the human type) can be filtered such that only objects of the selected type (e.g., perhaps the human type) remain for consideration by the ML algorithm and subsequent operations.

Based on whichever object is selected (in this case, a human), the embodiments then identify a ground contact 710, which is a position where the 2D object 700 is contacting the ground plane. In this case, the human male's feet are contacting the ground plane, so the feet are considered to be the ground contact 710. Of course, if any other body part or object part is contacting the ground, then that body part will be the ground contact 710.

Stated differently, the embodiments use the current calibration parameters to map the ground mass center of the detected object in the 2D image into the 3D ground space in order to define the location of this object in 3D space. At this ground location in 3D space, the embodiments then generate a virtual object of the same particular type as the object.

The embodiments then generate a 3D virtual object 715 in 3D space 720, where the 3D virtual object 715 is designed to correspond to the 2D object 700 and where the mapped ground contact 725 is designed to be a 3D equivalent ground contact corresponding to the ground contact 710. In this case, because the 2D object 700 is a human male, the 3D virtual object 715 is generated to correspond to a human male. If a vehicle were selected, then a 3D virtual vehicle would be generated. Similarly, if a human female were selected, then a 3D virtual human female would be generated. In any event, the embodiments generate a 3D virtualized version of the 2D object 700. Notably, the orientation or pose of the 3D virtual object 715 in 3D space 720 is initially selected in an attempt to mimic a predicted orientation of the 2D object 700 if the 2D object 700 was actually a 3D object.

In some cases, the 3D virtual object 715 includes complex features, contours, and geometries corresponding to the features, contours, and geometries detected in the 2D object 700. In some cases, the 3D virtual object 715 is a simplified 3D virtual object, as will be discussed in more detail momentarily.

Figure 8:
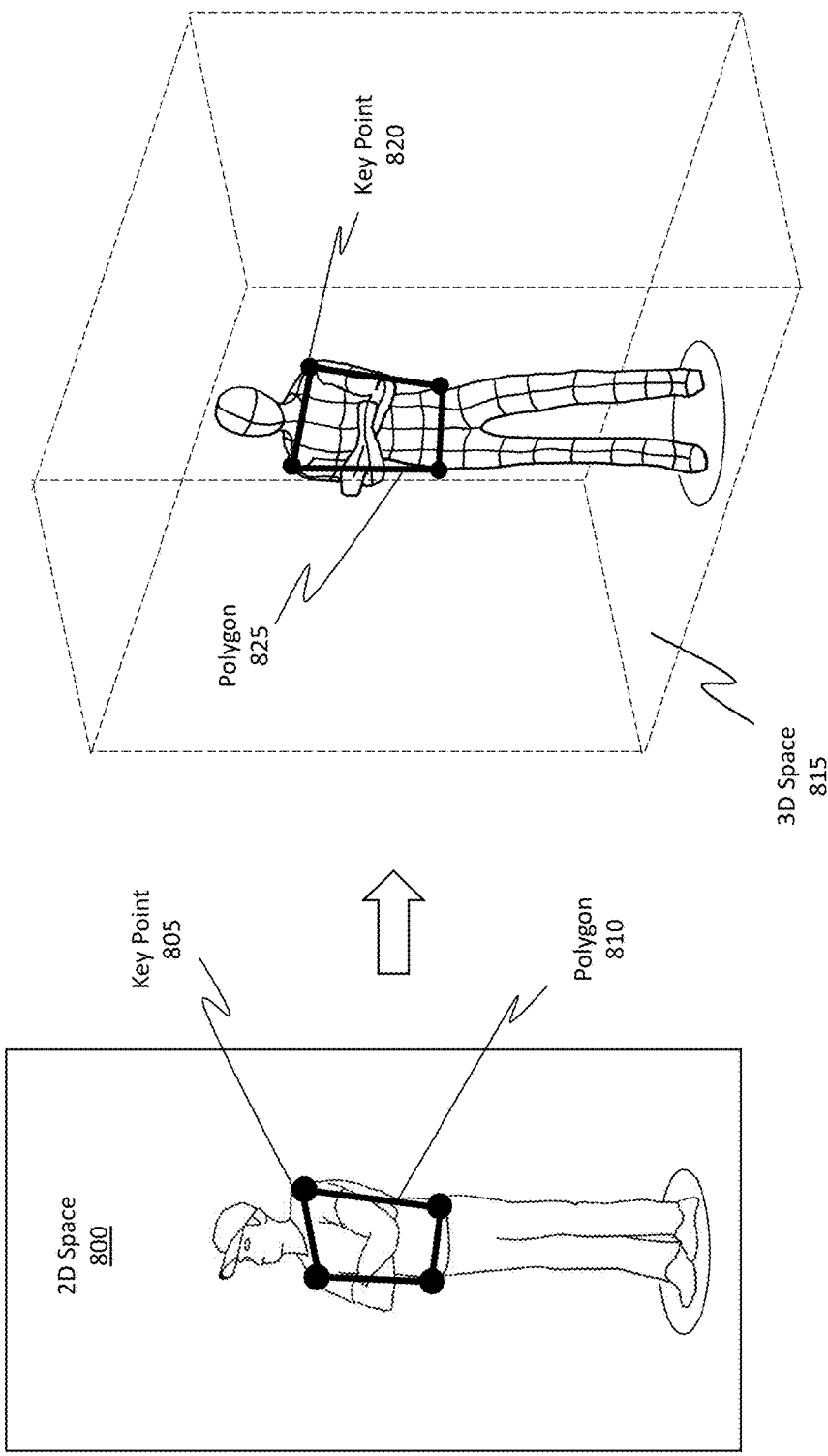
FIG. 8 illustrates how any number of key points may be generated for the 3D virtual object as well as for the original 2D object.

FIG. 8 further expands on the concepts taught in FIG. 7. Specifically, FIG. 8 again shows the 2D human male in 2D space 800. Now, however, the key points have been filtered or focused to include only a selected number of key points designed to correspond to a human's upper body quadrilateral or polygon. For instance, FIG. 8 shows a key point 805 corresponding to one of the human's shoulders. Three additional key points are illustrated but not labeled. The combination of these key points defines a polygon 810, which maps or represents the human's upper body polygon (in this case a quadrilateral).

FIG. 8 shows the 3D virtual object in 3D space 815 with its corresponding set of key points (e.g., key point 820) that, as a whole, also define a polygon 825, which is representative of the 3D virtual object's upper body polygon (in this case a quadrilateral). As will be discussed in more detail later, determining the orientation of a person's upper body quadrilateral also reveals the area of focus of that person. Accordingly, the embodiments will determine a gaze direction or area of focus of a human (or other object) by determining the object's 3D orientation.

Figure 9:
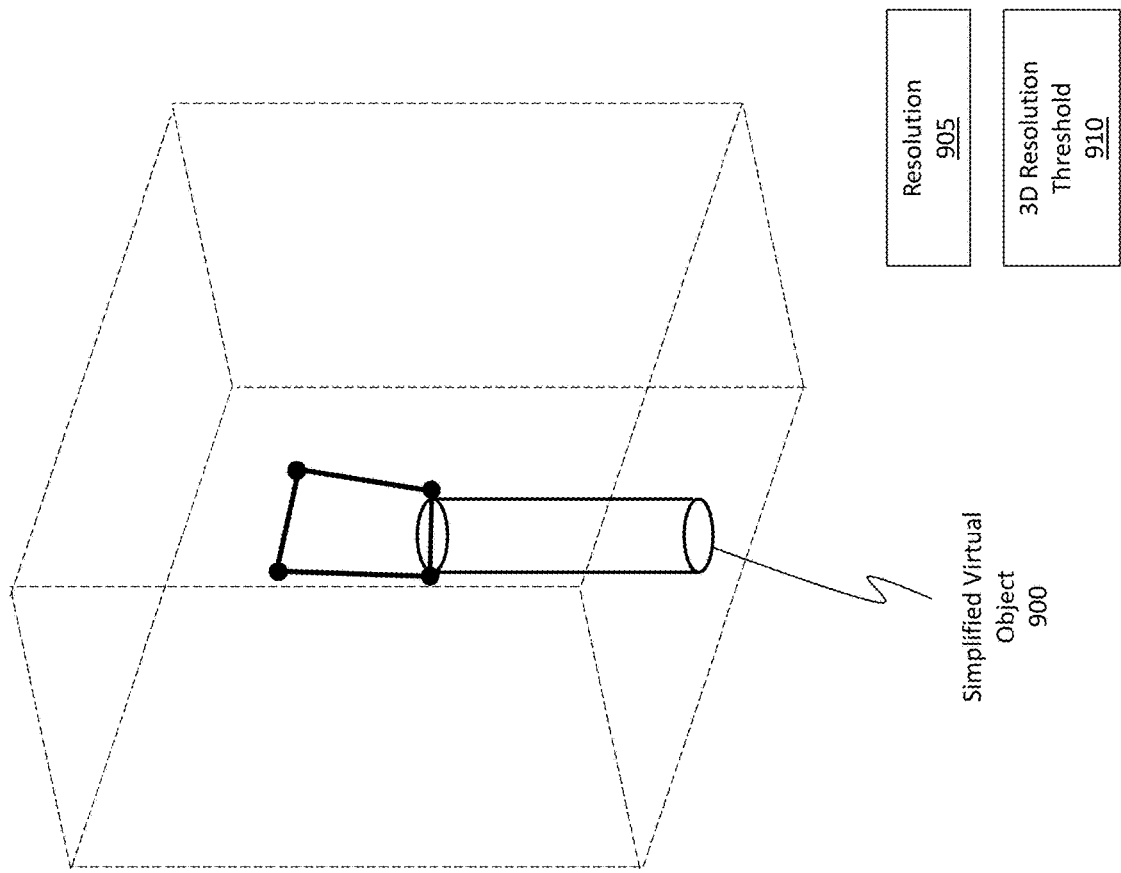
FIG. 9 illustrates how the 3D virtual object may be a simplified virtual object having a reduced 3D resolution.
Figure 9:
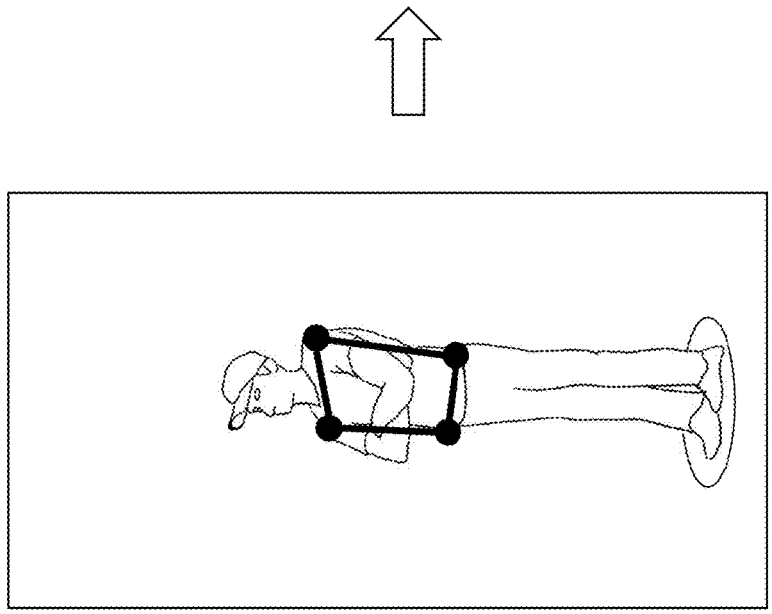

Whereas FIG. 8 shows the 3D virtual object as being a complex representation of different shapes, contours, and geometries, some embodiments are configured to generate a simplified 3D representation, as shown in FIG. 9. Specifically, FIG. 9 shows a simplified virtual object 900 in 3D space. This simplified virtual object 900 has a reduced resolution 905 in 3D as compared to the detailed resolution of the 3D virtual objects in the previous figures.

Using a human as an example, the simplified virtual object 900 may be a simple sphere for the human's head (or perhaps no head at all), a polygon or quadrilateral for the human's torso, and cylinder for the human's remaining body parts or legs. In any event, some 3D virtual objects are simplified virtual objects designed to have reduced resolutions that are designed to not exceed a predetermined 3D resolution threshold 910 (i.e. the resolutions are less than the determined 3D resolution threshold 910), which controls how detailed a 3D virtual object is to appear. Some 3D virtual objects are designed to have higher detail while others are designed to have lower detail.

Rotating Orientations in 3D Space

Figure 10A:
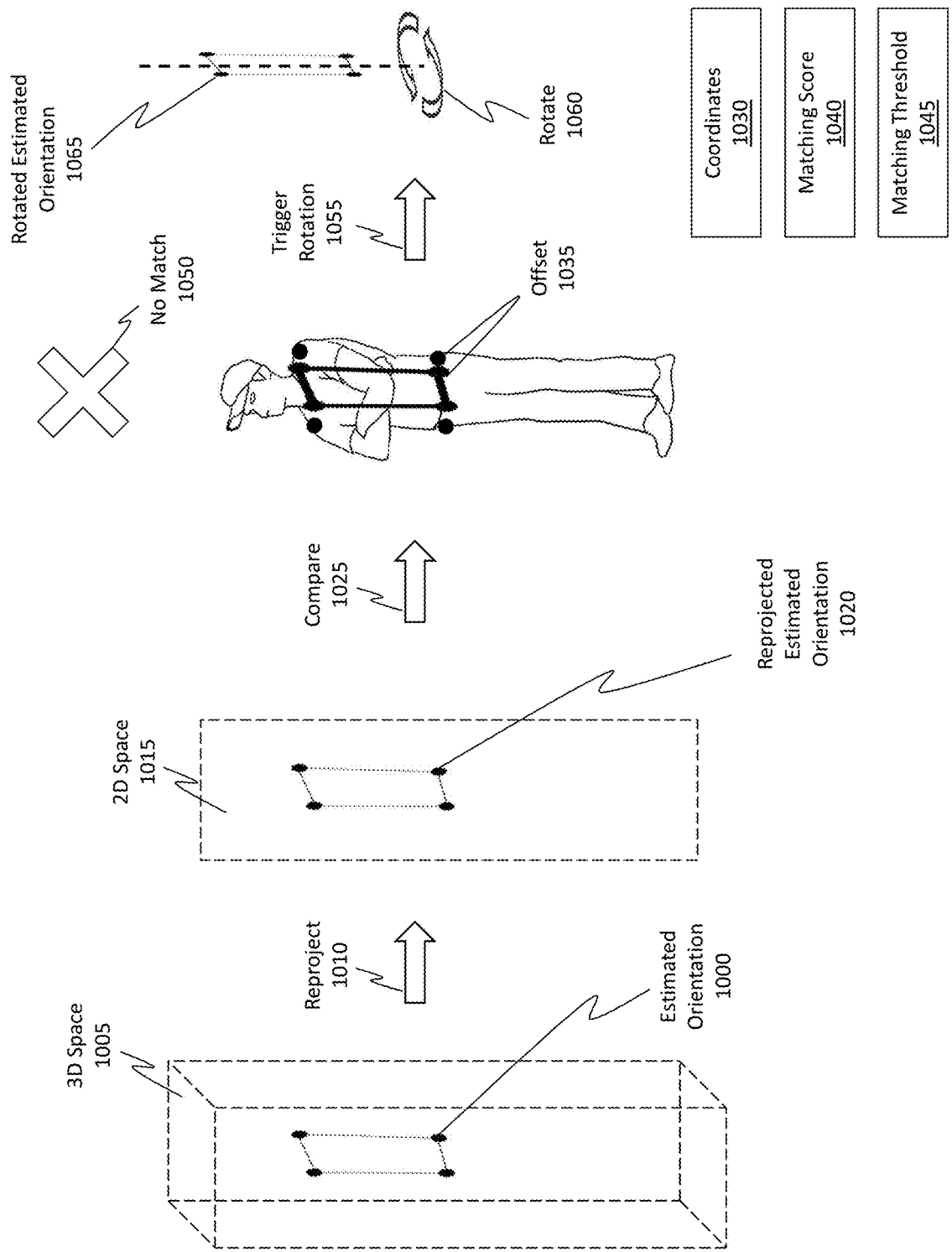
FIGS. 10A and 10B illustrate a process of generating an estimated orientation in 3D space, reprojecting that orientation into 2D space, comparing reprojected key points against key points of the original 2D object, and then rotating the estimated orientation in 3D space around the unit circle.

Attention will now be directed to FIG. 10A, which illustrates an example process of dynamically determining or selecting an orientation of an object in 3D space. Initially, FIG. 10A shows an estimated orientation 1000 (aka a "second" polygon where the "first" polygon is the baseline polygon 810 of FIG. 8). If the 2D object (e.g., object 410 of FIG. 4) were to be reprojected into 3D space, that 2D object would have a pose or orientation. The estimated orientation 1000 is designed in an effort to estimate or mimic that orientation. Similarly, estimated orientation 1000 is representative of the polygon 825 of FIG. 8 in that this estimated orientation 1000 is currently in 3D space 1005.

In accordance with the disclosed principles, the embodiments reproject 1010 the estimated orientation 1000 from 3D space 1005 into 2D space 1015, thereby forming the reprojected estimated orientation 1020. Once this 2D visualization is generated (i.e. reprojected estimated orientation 1020), the embodiments compare (as shown by compare 1025) the reprojected estimated orientation 1020 against the polygon of the original 2D object (e.g., polygon 810 of FIG. 8). FIG. 10A shows an overlaid visualization of the reprojected estimated orientation 1020 overlaid on top of the human male with the corresponding key points forming the polygon 810 from FIG. 8.

As a part of the compare 1025 operation, the embodiments compare the coordinates 1030 of the key points (i.e. the dark circles) forming the reprojected estimated orientation 1020 against the coordinates 1030 of the key points forming the polygon 810 from FIG. 8. The offset 1035 between the coordinates is referred to as the matching score 1040. For instance, the matching score 1040 may be based on the offsets between the left shoulder's corresponding two key points (i.e. from the polygon 810 and the reprojected estimated orientation 1020), the right shoulder's corresponding two key points, the left hip's corresponding two key points, and the right hip's corresponding two key points. The matching score 1040 may be based on the combinations of these different offsets. In some cases, a key point corresponding to a particular body part or object part may be weighted or prioritized as compared to other key points. For instance, perhaps the two shoulder key points are weighted or prioritized more heavily than the key points for the hips. In some cases, the embodiments may determine that fitting, aligning, or matching the shoulder key points produces improved results as compared to fitting the hip key points. As such, priority may be given to the shoulder key points may adding a weight to the calculus of the matching score 1040 for those prioritized key points.

If the matching score 1040 is below a matching threshold 1045, then the reprojected estimated orientation 1020 sufficiently aligns or fits with the polygon 810. If the matching score 1040 is above the matching threshold 1045, then the reprojected estimated orientation 1020 does not sufficiently align or fit with the polygon 810.

In the scenario of FIG. 10A, the matching score 1040 exceeds the matching threshold 1045, resulting in a condition of no match 1050 (i.e. not sufficiently aligned). Because there is no match 1050, the embodiments are triggered to perform a rotation event (as shown by trigger rotation 1055).

Figure 10B:
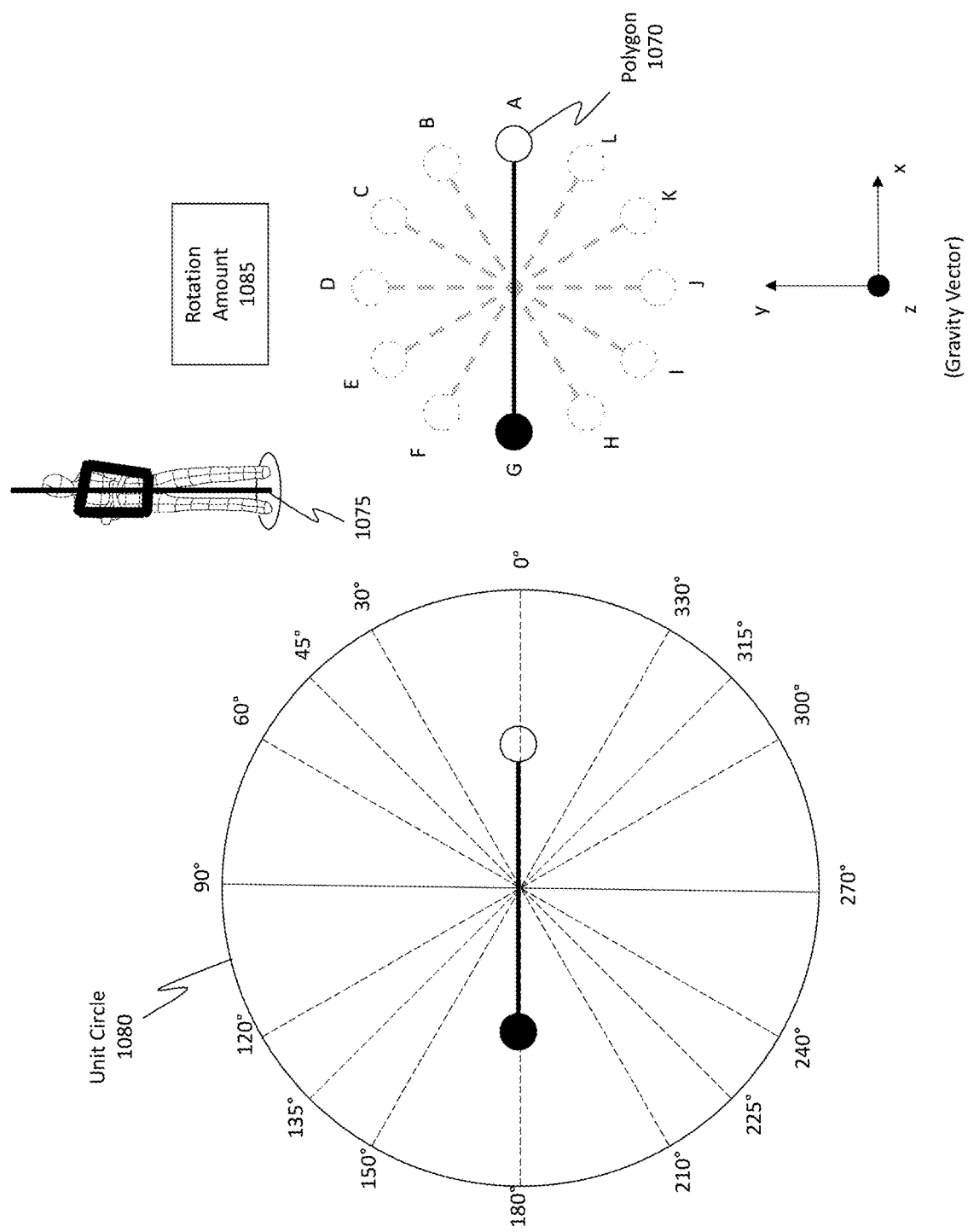

Specifically, the embodiments rotate 1060 (in 3D space 1005) the estimated orientation 1000 a determined amount to thereby generate a rotated estimated orientation 1065 in 3D space 1005. FIG. 10B provides some additional details regarding this rotation event.

FIG. 10B is taken from a bird's eye view, or from a top looking down view, as represented by the x-y-z legend. Specifically, the z-axis is looking directly into the page and corresponds to the gravity vector. The x-axis and the y-axis are orthogonal to each other and to the z-axis.

FIG. 10B shows a polygon 1070, which corresponds to the estimated orientation 1000 polygon shown in FIG. 10A and to the polygon 825 shown in FIG. 8. Notably, the polygon 1070 is in 3D space and corresponds to the orientation of the 3D virtual object.

The disclosed embodiments are able to rotate the polygon 1070 in 3D space using the z-axis as the axis of rotation. Furthermore, the axis of rotation corresponds to an imaginary line (labeled as line 1075) running through the center of the 3D virtual object and striking the ground plane at the ground contact mentioned earlier. The rotation occurs relative to the unit circle 1080, as shown. The rotation may occur in a clockwise manner or in a counterclockwise manner.

For reference purposes, the polygon 1070 is shown as including an unfilled circle on the right hand side and a dark circle on the left hand side in order to indicate how the polygon 1070 may not be symmetric and in order to better illustrate the rotation effect. Initially, the unfilled circle of the polygon 1070 is shown as being as position "A". The embodiments are able to rotate the polygon 1070 in 3D space around the unit circle 1080 to any of the other positions. For instance, the unfilled circle of the polygon 1070 can be rotated until it arrives at any of the other positions, including positions "B," "C," "D," "E," "F," "G," "H," "I," "J," "K," and "L." In this regard, the unfilled circle can be rotated a full 360 degrees around the unit circle 1080.

A rotation amount 1085 can be selected to determine how far to rotate the polygon 1070. For instance, the rotation amount 1085 can be set to any value, such as 1°, 2°, 3°, 4°, 5°, 6°, 7°, 8°, 9°, 10°, 15°, 20°, 30°, 40°, 45°, 50°, 60°, 90°, 180°, or any other rotation amount. Turning briefly back to FIG. 10A, the rotate 1060 operation includes rotating (in 3D space) the estimated orientation 1000 a selected rotation amount (e.g., rotation amount 1085) to thereby generate a new estimated orientation in the form of rotated estimated orientation 1065.

Figure 11:
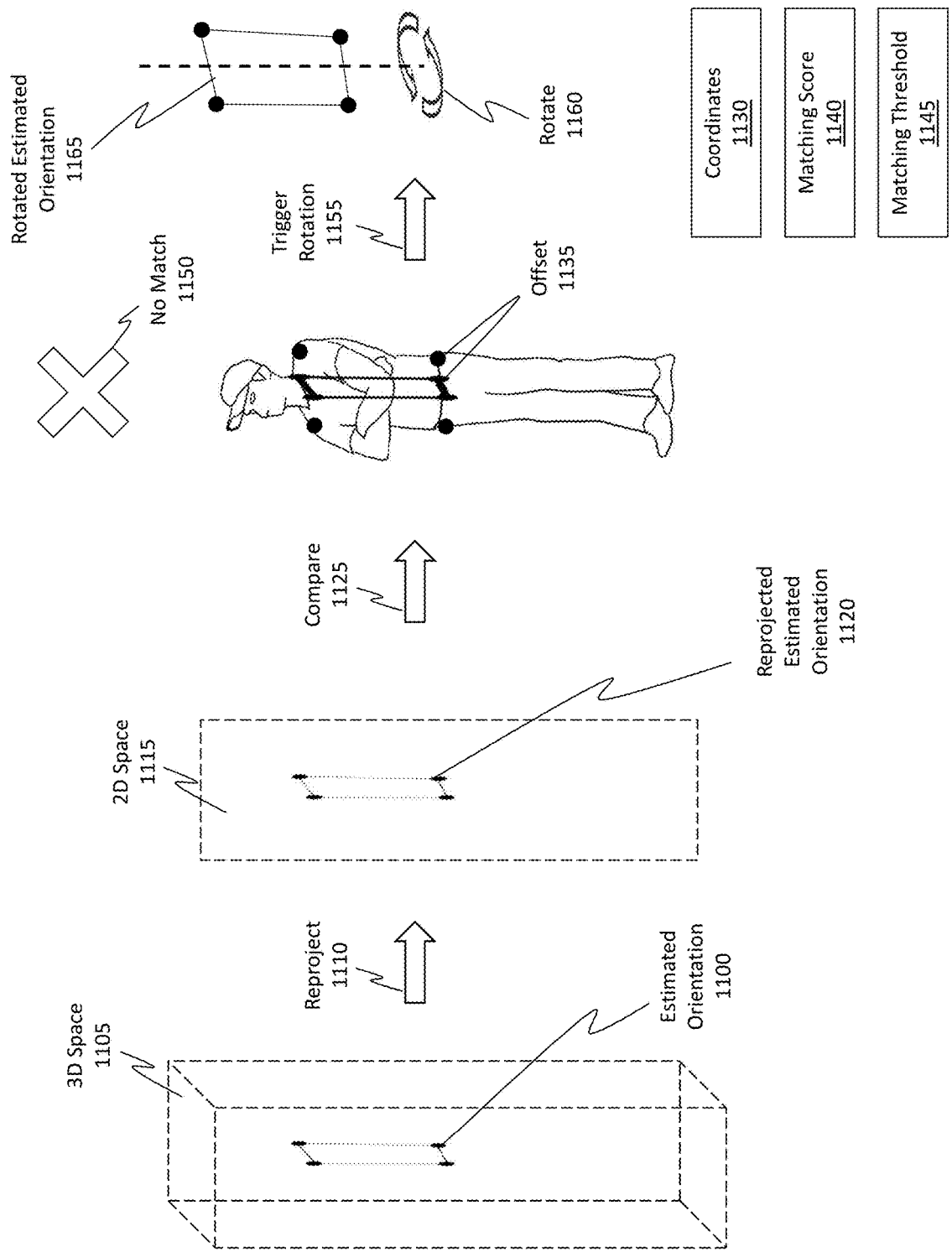
FIG. 11 illustrates another example scenario of generating and comparing orientations.

FIG. 11 shows the use of the rotated estimated orientation 1065, which is now in the form of estimated orientation 1100 and which is provided in 3D space 1105. In accordance with the disclosed principles, the embodiments again reproject 1110 the estimated orientation 1100 from 3D space 1105 into 2D space 1115, thereby forming the reprojected estimated orientation 1120. Once this 2D visualization is generated (i.e. reprojected estimated orientation 1120), the embodiments compare (as shown by compare 1125) the reprojected estimated orientation 1120 against the polygon of the original 2D object (e.g., polygon 810 of FIG. 8). FIG. 11 shows an overlaid visualization of the reprojected estimated orientation 1120 overlaid on top of the human male with the corresponding key points forming the polygon 810 from FIG. 8.

As a part of the compare 1125 operation, the embodiments compare the coordinates 1130 of the key points (i.e. the dark circles) forming the reprojected estimated orientation 1120 against the coordinates 1130 of the key points forming the polygon 810 from FIG. 8. The offset 1135 between the coordinates is referred to as the matching score 1140. If the matching score 1140 is below a matching threshold 1145, then the reprojected estimated orientation 1120 sufficiently aligns or fits with the polygon 810. If the matching score 1140 is above the matching threshold 1145, then the reprojected estimated orientation 1120 does not sufficiently align or fit with the polygon 810. The matching threshold 1145 is the same as the matching threshold 1045 from FIG. 10A.

In the scenario of FIG. 11, the matching score 1140 exceeds the matching threshold 1145, resulting in a condition of no match 1150 (i.e. not sufficiently aligned). Because there is no match 1150, the embodiments are triggered to perform another rotation event (as shown by trigger rotation 1155). Specifically, the embodiments rotate 1160 (in 3D space 1105) the estimated orientation 1100 a determined amount to thereby generate a rotated estimated orientation 1165 in 3D space 1105.

Figure 12:
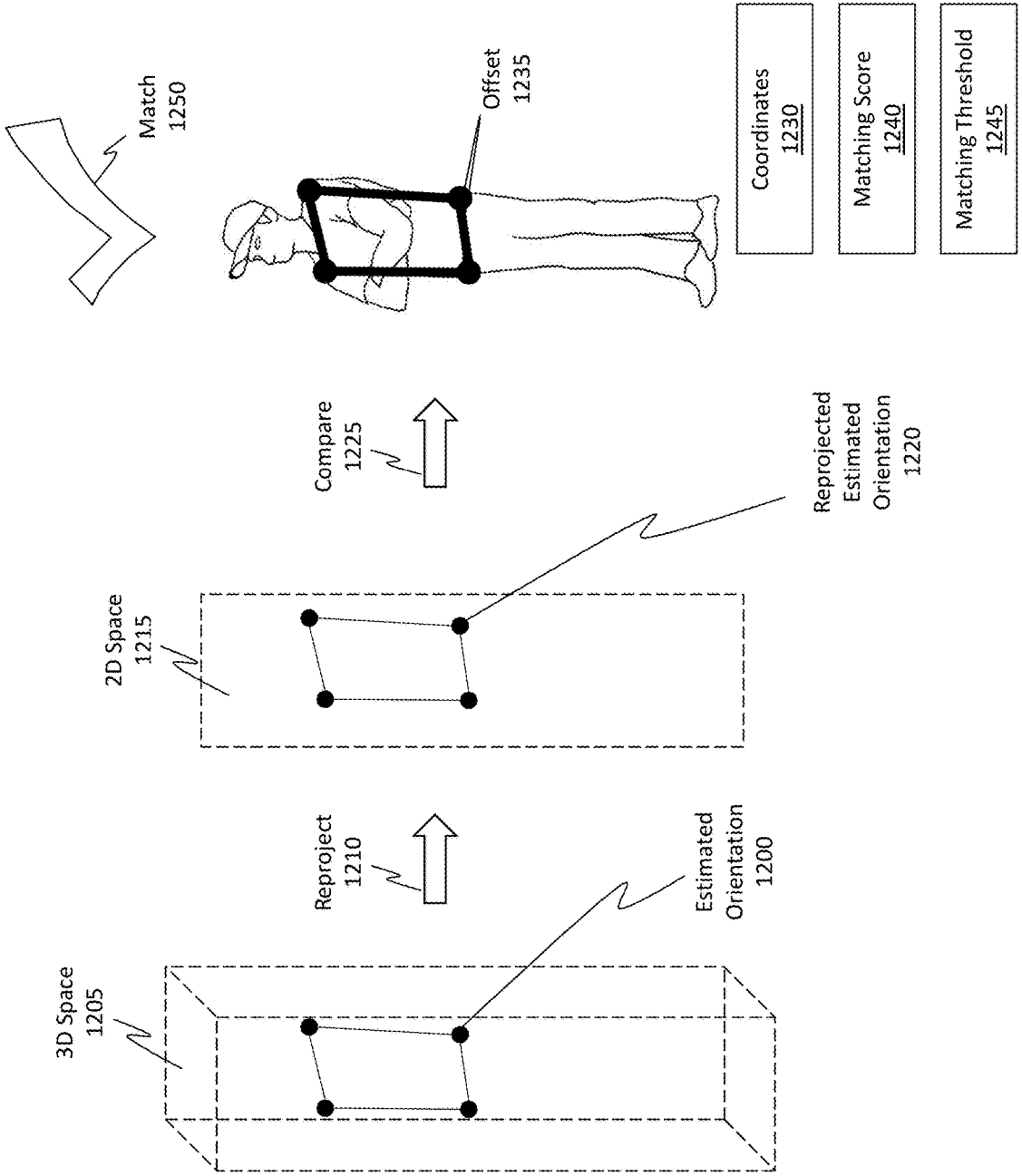
FIG. 12 illustrates another example scenario of generating and comparing orientations.

FIG. 12 shows the use of the rotated estimated orientation 1165, which is now in the form of estimated orientation 1200 and which is provided in 3D space 1205. In accordance with the disclosed principles, the embodiments again reproject 1210 the estimated orientation 1200 from 3D space 1205 into 2D space 1215, thereby forming the reprojected estimated orientation 1220. Once this 2D visualization is generated (i.e. reprojected estimated orientation 1220), the embodiments compare (as shown by compare 1225) the reprojected estimated orientation 1220 against the polygon of the original 2D object (e.g., polygon 810 of FIG. 8). FIG. 11 shows an overlaid visualization of the reprojected estimated orientation 1220 overlaid on top of the human male with the corresponding key points forming the polygon 810 from FIG. 8.

As a part of the compare 1225 operation, the embodiments compare the coordinates 1230 of the key points (i.e. the dark circles) forming the reprojected estimated orientation 1220 against the coordinates 1230 of the key points forming the polygon 810 from FIG. 8. The offset 1235 between the coordinates is referred to as the matching score 1240. If the matching score 1240 is below a matching threshold 1245 (i.e. the same as matching threshold 1145 and 1045), then the reprojected estimated orientation 1220 sufficiently aligns or fits with the polygon 810. If the matching score 1240 is above the matching threshold 1245, then the reprojected estimated orientation 1220 does not sufficiently align or fit with the polygon 810.

In the scenario of FIG. 12, the matching score 1240 does not exceed the matching threshold 1245, resulting in a condition of a match 1250 (i.e. sufficiently aligned). Because there is a match 1250, the embodiments have identified a 3D orientation (i.e. estimated orientation 1200) that, when reprojected into 2D space, sufficiently aligns with the key points of the 2D object.

Turning briefly back to FIG. 10B, it should be noted that the embodiments are able to perform the rotations in a number of different ways. In some implementations, the embodiments generate a first estimated orientation and then rotate that estimated orientation around the unit circle 1080 in accordance with the selected rotation amount 1085. For instance, the polygon 1070 may be the estimated orientation, and the embodiments may first rotate the polygon 1070 to each of the positions "A" through "L" and generate a corresponding 2D reprojected version of the polygon 1070 at the corresponding rotated position. In this manner, a number of 2D rotated estimated orientations have now been produced. Once these 2D rotated estimated orientations have been generated, then they may each be compared against the polygon 810 of FIG. 8 in the manner described earlier. The 2D rotated estimated orientation having the lowest matching score (i.e. the one with the least amount of offset) may be selected provided it satisfies the matching threshold, as discussed earlier.

In this regard, multiple rotations and reprojections may occur prior to the comparison process. Once those reprojections are performed, then multiple comparison processes may be performed to identify the reprojection with the best or least amount of offset.

In another implementation, the entire process outlined in FIG. 10A may be performed, where an orientation is generated, it is reprojected, and then compared against the baseline polygon 810 of FIG. 8. Only if the matching score exceeds the matching threshold do the embodiments proceed with generating another orientation by performing the rotation processes described earlier. In this example, therefore, the embodiments incrementally generate new orientations until a specific orientation is identified as being satisfactory (e.g., a suitable matching score). With this process, it may be the case that the polygon 1070 of FIG. 10B, and in particular the unfilled circle of polygon 1070, may not be fully rotated around the unit circle 1080. For instance, if the unfilled circle is rotated to position "B" and the embodiments determine that the matching score is adequate, then the embodiments may stop without performing any additional rotations. In the first implementation, however, the unfilled circle is rotated to all of the positions and then the position with the best matching score is selected.

In some implementations, the embodiments dynamically adjust the rotation amount 1085 in various different ways. For instance, in some cases the rotation amount 1085 may be the same for each rotation event. To illustrate, the rotation amount 1085 between position "A" and "B" may be 30 degrees, and the rotation amount 1085 between position "B" and position "C" may also be 30 degrees, and so on. In this regard, each rotation of the polygon 1070 in 3D space may be a same rotation amount within the unit circle.

In other cases, however, the rotation amount 1085 may vary. For instance, the rotation amount 1085 between position "A" and "B" may be 30 degrees but the rotation amount between position "B" and position "C" may be some other value (e.g., perhaps 45 degrees). Selecting the rotation amount 1085 may, in some cases, be statically set (as described in the first implementation) or it may be dynamic (as described in the second implementation).

Determining how to dynamically alter the rotation amount 1085 may be based on the matching score that is generated for a particular estimated orientation after it is reprojected and compared against the baseline polygon 810 from FIG. 8. A tiered approach may be used to determine how to adjust the rotation amount 1085.

For instance, if the matching score is between a lower threshold "x" and an upper threshold "y", then a first rotation amount may be used to subsequently perform the rotation. On the other hand, if the matching score is between a lower threshold "y" (previously the upper threshold) and an upper threshold "z," then a second (perhaps larger) rotation amount may be used to subsequently perform the rotation. A larger rotation can help the embodiments to quickly "hone in" or discover the orientation with the best resulting matching score.

By way of example, suppose the initial estimated orientation places the unfilled circle of the polygon 1070 in FIG. 10B at position "A." However, the orientation with the best score will actually occur when the unfilled circle is at position "G." If a static approach to selecting the rotation amount 1085 were used, then the unfilled circle may traverse all of positions "B" through "F" prior to reaching position "G." On the other hand, if a dynamical approach to selecting the rotation amount 1085 were used, then a fewer number of rotations may be performed.

By way of example, suppose the unfilled circle started at position "A," but it was then rotated to position "F." Based on the resulting matching score, the embodiments may then reduce the rotation amount 1085, thereby potentially causing the unfilled circle to be rotated to position "H" and then subsequently rolling back to position "G" based on the new matching score.

In this case, only a total of three rotations were performed whereas in the static rotation amount case, six rotations were performed. Accordingly, different rotation techniques (both clockwise and counterclockwise or a combination of clockwise and counterclockwise) may be employed by the disclosed embodiments in order to identify an orientation with the best matching score. Based on that example, one will appreciate how, in some implementations, rotating the polygon 1070 a selected number of times may cause the polygon 1070 to incrementally traverse at least a portion, but potentially not all, of the unit circle in 3D space.

To clarify, in some cases, rotating the polygon 1070 a selected number of times results in the polygon 1070 rotating around the unit circle. In other cases, rotating the polygon 1070 a selected number of times results in the polygon 1070 rotating only a portion, but not a full amount, of the unit circle. In some embodiments, the selected number of times the polygon 1070 is rotated is between 10 times and 64 times. In some cases, the selected number of times the polygon 1070 is rotated is about 32 times or perhaps 36 times.

Figure 13:
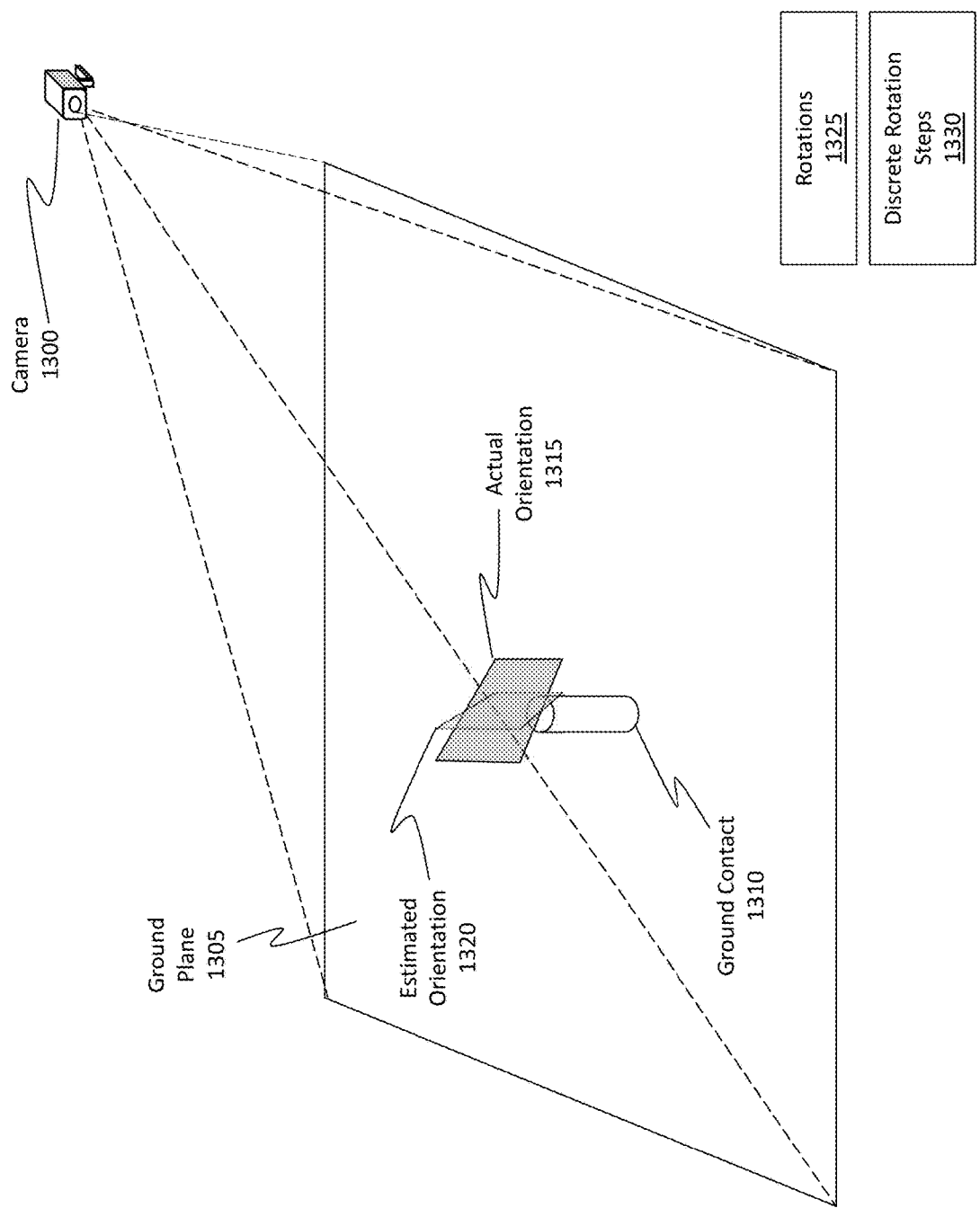
FIG. 13 illustrates an abstracted visualization of rotating orientations in 3D space.

FIG. 13 illustrates an abstracted view in 3D space of the rotation operations. FIG. 13 shows a camera 1300 reprojected into 3D space as well as the ground plane 1305 and the ground contact 1310, which is the area at which the object contacts the ground plane 1305 and which is representative of the mapped ground contact 725 of FIG. 7.

FIG. 13 also shows a simplified version of the 3D virtual object (e.g., a simple cylinder). If the 2D object were reprojected in 3D space, then that object would have an actual orientation 1315, which is what the embodiments are attempting to determine. Therefore, the embodiments generate an estimated orientation 1320 and then perform any number of rotations 1325 in order to generate an orientation with the best resulting matching score (when reprojected into 2D space). The rotations 1325 may occur using any number of discrete rotation steps 1330, as was discussed in connection with the rotation amount 1085 of FIG. 10B0.

By way of additional clarification, the embodiments generate a 3D orientation and then reproject that orientation into 2D space. The objects in the original image are all in 2D space, so those objects serve as the baseline for determining whether the 3D orientation is correct. As a consequence, the embodiments generate any number of rotated estimates and reproject those estimates into 2D space in order to be compared against the 2D object. The estimated orientation that has the best matching score (after the 3D orientation was reprojected into 2D space) will be selected and set as the determined, derived, or deduced orientation of the 2D object (if that 2D object had actually been a 3D object).

Figure 14:
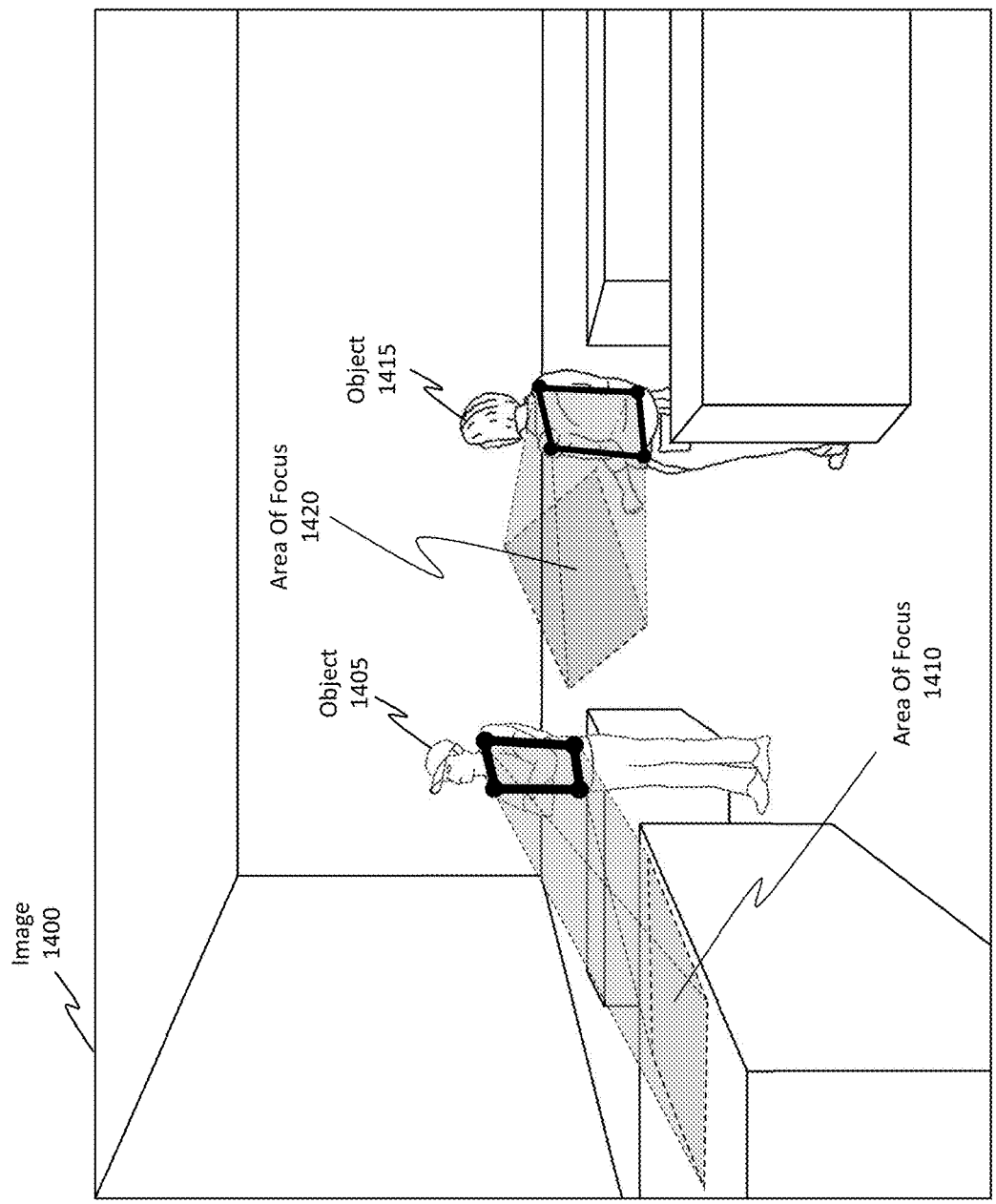
FIG. 14 illustrates how, once a 3D orientation is deduced or determined, an area of focus of a human or other object (e.g., perhaps where the object is facing or aimed at) can be identified.

FIG. 14 shows how, based on the ability to determine an object's 3D orientation, the embodiments are then able to determine an area of focus, or a gaze direction, of the object in 2D space. Specifically, FIG. 14 shows an image 1400, which is representative of the images discussed thus far.

In this scenario, the embodiments have already determined a 3D orientation that, when reprojected into 2D space, aligns with the key points of the object 1405. Based on this determined 3D orientation, the embodiments are then able to determine where the object 1405 is facing and determine an area of focus 1410 of the object 1405 in 2D space. Similar operations were performed for the object 1415, and the area of focus 1420 was determined.

Because the embodiments have determined the orientation of the object 1405 in 3D space, that orientation is used to determine the area of focus 1410. For instance, in 3D space, 3D rays can be projected outward and in the direction defined by the orientation of the 3D virtual object. The area where those 3D rays strike can then be identified and selected in 2D space as the area of focus 1410. For instance, the key point corresponding to a human's left shoulder may be oriented (e.g., based on the orientation) in a downward sloping manner. When the orientation of that key point is considered in combination with the orientations of the other key points, a direction of focus may be determined, and the resulting 3D rays can be projected outward based on that direction. The area where those resulting rays strike can be determined and set as the area of focus.

Stated differently, the process of determining the area of focus may be performed by defining (e.g., for each key point) the orientation of the 3D virtual object based on the specific reprojected rotated second polygon. The embodiments may then project a corresponding 3D ray outward in a direction defined by the orientation. Those rays can then be mapped into 2D space. The embodiments then identify areas of intercept where those rays are intercepting objects in the image. The area of focus is then set as the areas of intercept.

A log or record may be maintained to determine common areas where objects focus their attentions on or are aimed at. For instance, if the top of the counter (i.e. currently the area of focus 1410 shown in FIG. 14) is frequently the focus of attention as among multiple humans, then that counter top may be a highly desirable location on which to place certain goods or other items. The embodiments are able to monitor and record areas where humans place their attention and compile the data to identify concentrated areas where multiple humans have focused their attentions on. A log may be maintained for any location, such as any retail location, banking location, indoor or outdoor location. Those areas may become prime real estate for placing an advertisement. Similarly, the embodiments are able to trigger an alarm if a human should be placing his/her attention at a particular location (e.g., perhaps a hole in the ground) but is currently not and is about to collide or enter the location. The alarm may be used to alert the human of the impending disaster.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 15A:
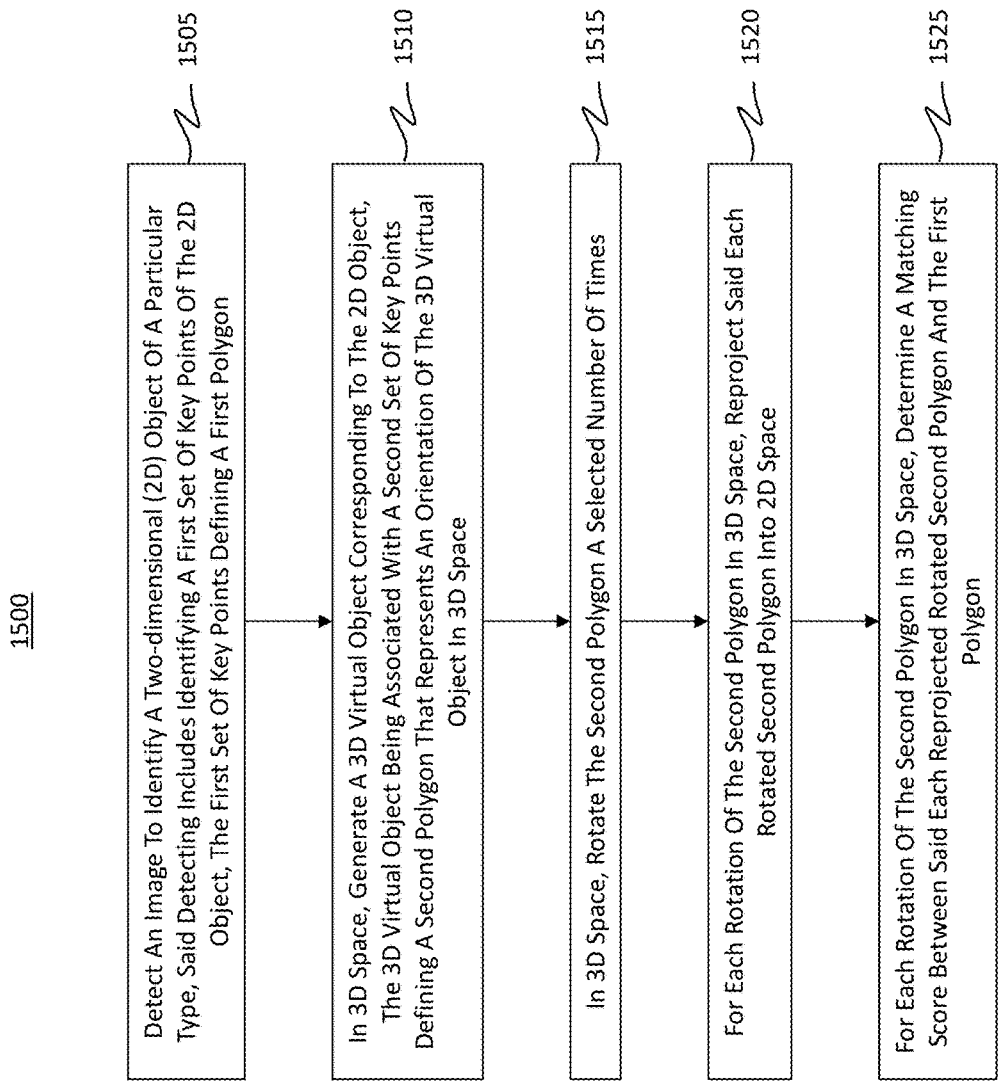
FIGS. 15A and 15B illustrate flowcharts of example methods for automatically determining the orientation of an object in 3D space.

FIG. 15A shows a flowchart of an example method 1500 for determining the 3D orientation of an object in 3D space relative to a determined gravity vector (e.g., gravity vector 110 of FIG. 1), where the object is detected in a 2D image. Initially, method 1500 includes an act (act 1505) of analyzing an image to identify a two-dimensional (2D) object of a particular type. In some cases, a bounding box may first be generated and then the key points may be generated after the bounding box.

In real life, the object may be a 3D object, but because the image is a 2D image, the object as it appears in the image is also a 2D object. With regard to this act, the image 400 of FIG. 4 may be segmented to identify objects of the human type. This segmenting process includes identifying a first set of key points of the 2D object. For instance, the key points 615A, 615B, 620A, and 620B of FIG. 6 may constitute the first set of key points. Furthermore, the first set of key points define a first polygon, as shown by polygon 810 of FIG. 8.

In 3D space, there is then an act (act 1510) of generating a 3D virtual object corresponding to the 2D object. For instance, the 3D virtual object 715 of FIG. 7 corresponds to the 2D object 700. The 3D virtual object is associated with a second set of key points defining a second polygon that represents an orientation of the 3D virtual object in 3D space. To illustrate, FIG. 8 shows a number of key points (e.g., key point 820) for the 3D virtual object, where the combination of those key points (e.g., the dark circles) define the polygon 825, which is representative of the 3D orientation of the 3D virtual object. The key points illustrated by the estimated orientation 1000 of FIG. 10A are also representative of the second polygon.

Method 1500 includes an act (act 1515) of rotating (in 3D space) the second polygon a selected number of times. The second polygon may be rotated a selected number of degrees relative to a unit circle (e.g., unit circle 1080 from FIG. 10B) for each rotation of the selected number of times the second polygon is rotated. The rotate 1060 operation in FIG. 10A and the rotate 1160 operation in FIG. 11 are representative of act 1515.

For each rotation of the second polygon in 3D space, there is an act (act 1520) of reprojecting each rotated second polygon into 2D space. For instance, the reproject 1010 operation in FIG. 10A and the reproject 1110 operation in FIG. 11 are representative of act 1520.

Similarly, for each rotation of the second polygon in 3D space, there is an act (act 1525) of determining a matching score between each reprojected rotated second polygon and the first polygon. That is, the matching score is based on a computed offset between coordinates of key points included in each reprojected rotated second polygon and coordinates of the first set of key points. In some cases, determining the matching score between each reprojected rotated second polygon and the first polygon is performed by identifying an angle between each edge of the reprojected rotated second polygon and a corresponding edge defining the first polygon. For instance, perhaps the edges are the polygon points or key points associated with a top left shoulder. The matching score may be determined by identifying a difference between the angles of the top left key points. The number of resulting matching scores is based on the number of rotations that occur. As such, there may be any number of comparisons and matching scores, often, however, the number is between 10 and 64, as described earlier.

The matching score 1040 of FIG. 10A is representative of the matching score discussed in act 1525. FIG. 10A also shows an overlaid visualization in which the reprojected estimated orientation 1020 is overlaid on the human male. The polygon 810 from FIG. 8 is also overlaid on the human male. The embodiments compare the coordinates of the different key points to determine the offset for those key points. For instance, consider the bottom right key points as between the reprojected estimated orientation 1020 and the polygon 810. The offset 1035 between the coordinates of those key points is used to determine the matching score 1040, as well as the offsets of the other corresponding key points (e.g., the shoulder key points and the hip key points, etc.).

Figure 15B:
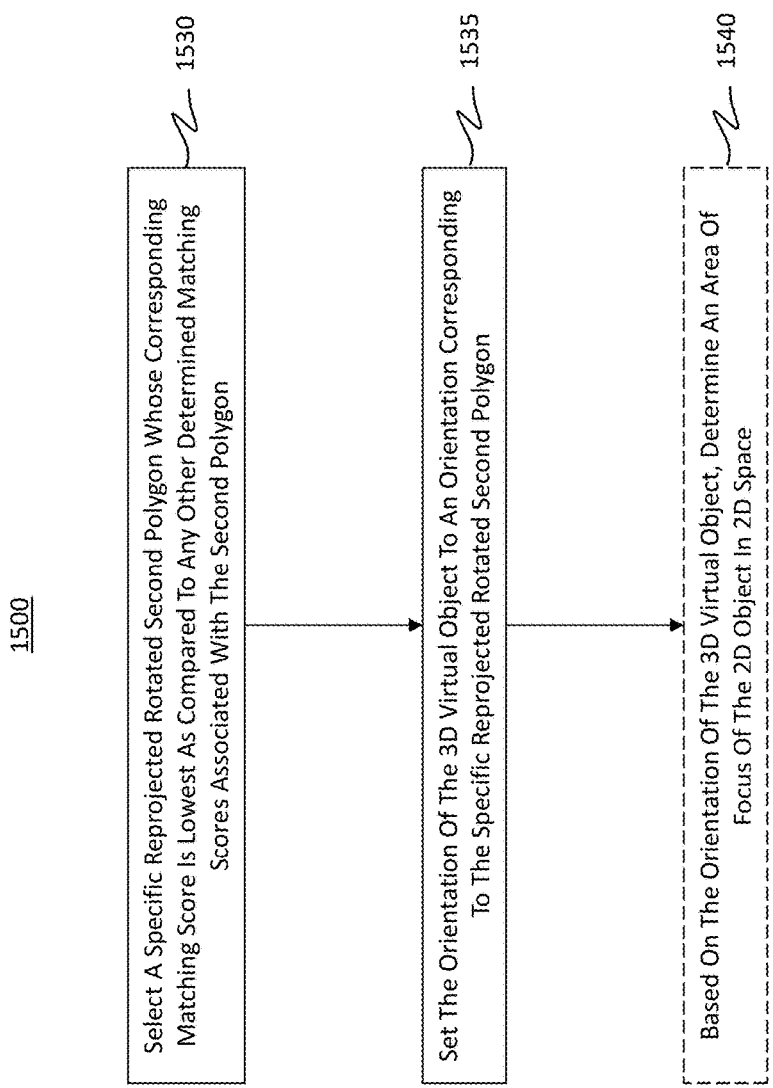

Method 1500 continues in FIG. 15B. Specifically, method 1500 includes an act (act 1530) of selecting a specific reprojected rotated second polygon whose corresponding matching score is lowest as compared to any other determined matching scores associated with the second polygon. For instance, the reprojected estimated orientation 1220 of FIG. 12 corresponds to the "specific reprojected rotated second polygon" discussed in act 1530. The matching score 1240 of the reprojected estimated orientation 1220 is lowest as compared to the matching score 1140 of the reprojected estimated orientation 1120 of FIG. 11 and the matching score 1040 of the reprojected estimated orientation 1020 of FIG. 10A.

Method 1500 then includes an act (act 1535) of setting the orientation of the 3D virtual object to an orientation corresponding to the specific reprojected rotated second polygon. For instance, with reference to FIG. 12, the orientation of the estimated orientation 1200 will be set as the orientation of the 3D virtual object 715 of FIG. 7 because the reprojected estimated orientation 1220 of FIG. 12 had the best matching score 1240. That is, the estimated orientation 1200, which is in 3D space, corresponds to the reprojected estimated orientation 1220, which is in 2D space.

Based on the orientation of the 3D virtual object, method 1500 then optionally (as indicated by the dotted box) includes an act (act 1540) of determining an area of focus of the 2D object in 2D space. For instance, FIG. 14 shows the area of focus 1410 is determined for the object 1405 based on performing the disclosed operations.

In this regard, the disclosed embodiments are able to beneficially identify an object in 2D space. Once that object is identified, then the embodiments generate an estimated orientation in 3D space for that object. The embodiments rotate the estimated orientation any number of times until a specific rotation is identified as being the closest fit with the object when the 3D orientation is reprojected into 2D space. By performing the disclosed operations, the embodiments are able to determine a gaze area or an area of focus on the object, even though the object is represented in a 2D image.

Example Computer/Computer Systems

Figure 16:
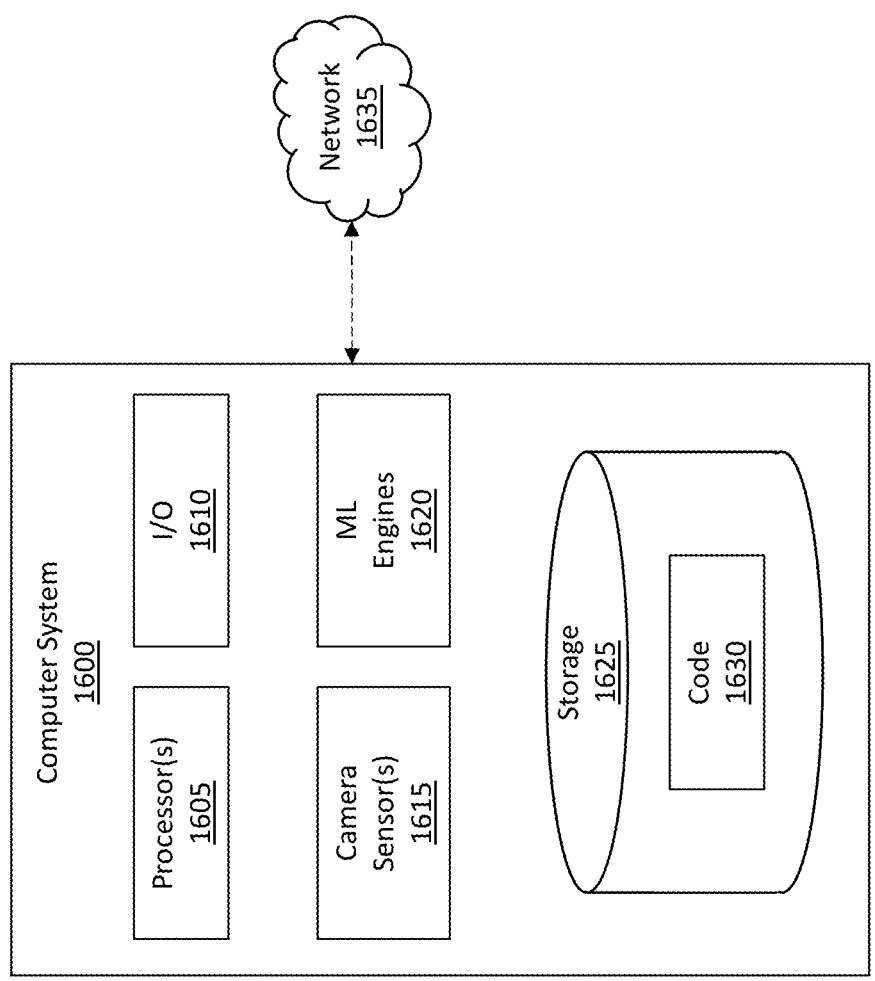
FIG. 16 illustrates an example computer system that may be configured to perform any of the disclosed operations.

Attention will now be directed to FIG. 16 which illustrates an example computer system 1600 that may include and/or be used to perform any of the operations described herein. Computer system 1600 may take various different forms. For example, computer system 1600 may be embodied as a monitoring camera, a tablet, a desktop, a laptop, a mobile device, a camera system, or a standalone device. Computer system 1600 may also be a distributed system that includes one or more connected computing components/devices that are in communication with computer system 1600.

In its most basic configuration, computer system 1600 includes various different components. FIG. 16 shows that computer system 1600 includes one or more processor(s) 1605 (aka a "hardware processing unit"), input/output I/O 1610, camera sensor(s) 1615, a ML engine 1620, and storage 1625.

Regarding the processor(s) 1605, it will be appreciated that the functionality described herein can be performed, at least in part, by one or more hardware logic components (e.g., the processor(s) 1605). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

The I/O 1610 can include any type of input or output device, without limit. Examples include a keyboard, a mouse, a touchscreen, a stylus, and so forth. Camera sensor(s) 1615 can include any type of camera, including the cameras discussed in this disclosure (e.g., those illustrated in FIG. 2).

The ML engine 1620 may be implemented as a specific processing unit (e.g., a dedicated processing unit as described earlier) configured to perform one or more specialized operations for the computer system 1600. The ML engine 1620 may include the ML algorithm 425 of FIG. 4 and the ML algorithm 605 of FIG. 6.

As used herein, the terms "executable module," "executable component," "component," "module," or "engine" can refer to hardware processing units or to software objects, routines, or methods that may be executed on computer system 1600. The different components, modules, engines, and services described herein may be implemented as objects or processors that execute on computer system 1600 (e.g. as separate threads). The ML engine 1620 (or perhaps even just the processor(s) 1605) can be configured to perform any of the disclosed method acts or other functionalities.

Storage 1625 may be physical system memory, which may be volatile, non-volatile, or some combination of the two. The term "memory" may also be used herein to refer to non-volatile mass storage such as physical storage media. If computer system 1600 is distributed, the processing, memory, and/or storage capability may be distributed as well.

Storage 1625 is shown as including executable instructions (i.e. code 1630). The executable instructions represent instructions that are executable by the processor(s) 1605 (or perhaps even the ML engine 1620) of computer system 1600 to perform the disclosed operations, such as those described in the various methods.

The disclosed embodiments may comprise or utilize a special-purpose or general-purpose computer including computer hardware, such as, for example, one or more processors (such as processor(s) 1605) and system memory (such as storage 1625), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1600 may also be connected (via a wired or wireless connection) to external sensors (e.g., one or more remote cameras) or devices via a network 1635. For example, computer system 1600 can communicate with any number devices or cloud services to obtain or process data. In some cases, network 1635 may itself be a cloud network. Furthermore, computer system 1600 may also be connected through one or more wired or wireless networks 1635 to remote/separate computer systems(s) that are configured to perform any of the processing described with regard to computer system 1600.

A "network," like network 1635, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1600 will include one or more communication channels that are used to communicate with the network 1635. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system that determines a three-dimensional (3D) orientation of an object that is represented within a two-dimensional (2D) image, said computer system comprising:
   one or more processors; and
   one or more computer-readable hardware storage devices that store instructions that are executable by the one or more processors to cause the computer system to:
   identify an object in an image, said identifying includes identifying a first set of key points of the object in 2D space;
   generate a 3D virtual object corresponding to the object, the 3D virtual object being associated with a second set of key points that represent an initial orientation of the 3D virtual object in 3D space, wherein the second set of key points define a polygon; and
   determine that an orientation of the object, as represented in the 2D space, corresponds to a matched orientation that is determined by rotating, in the 3D space, the second set of key points until the matched orientation is identified as between the rotated second set of key points in the 3D space and the first set of key points in the 2D space.

2. The computer system of claim 1, wherein execution of the instructions further causes the computer system to:
   based on the orientation of the object, determine an area of focus of the object in the 2D space.

3. The computer system of claim 1, wherein rotating the second set of key points causes the second set of key points to incrementally traverse at least a portion of a unit circle in the 3D space.

4. The computer system of claim 3, wherein the second set of key points are rotated between 10 times and 64 times.

5. The computer system of claim 4, wherein the second set of key points are rotated at least 32 times.

6. The computer system of claim 1, wherein the second set of key points are rotated around a unit circle.

7. The computer system of claim 1, wherein the second set of key points are rotated only a portion, but not a full amount, of a unit circle.

8. The computer system of claim 1, wherein the 3D virtual object is a simplified virtual object having a resolution that is less than a determined 3D resolution threshold.

9. A method for determining a three-dimensional (3D) orientation of an object that is represented within a two-dimensional (2D) image, said method comprising:
   identifying an object in an image, said identifying includes identifying a first set of key points of the object in 2D space;
   generating a 3D virtual object corresponding to the object, the 3D virtual object being associated with a second set of key points that represent an initial orientation of the 3D virtual object in 3D space, wherein the second set of key points define a polygon;
   rotating, in the 3D space, the second set of key points until a matched orientation is identified as between the rotated second set of key points in the 3D space and the first set of key points in the 2D space; and
   determining that an orientation of the object, as represented in the 2D space, corresponds to the matched orientation that was determined by rotating the second set of key points in the 3D space.

10. The method of claim 9, wherein the object is of a particular type, and wherein the particular type is a human type.

11. The method of claim 10, wherein objects that are identified as not being of the human type are refrained from having a corresponding orientation determined for said objects.

12. The method of claim 9, wherein the second set of key points are rotated a selected number of degrees relative to a unit circle for each rotation event.

13. The method of claim 9, wherein the second set of key points define a quadrilateral.

14. The method of claim 9, wherein the image is generated by a calibrated camera that is calibrated to map points on a 2D image to the 3D space and vice versa.

15. The method of claim 9, wherein the initial orientation of the 3D virtual object is initially selected in an attempt to mimic a predicted orientation of the object if the object was represented three-dimensionally.

16. The method of claim 9, wherein the second set of key points correspond to an upper quadrilateral of a human body.

17. A camera system comprising:
   a camera;
   one or more processors; and
   one or more computer-readable hardware storage devices that store instructions that are executable by the one or more processors to cause the camera system to:
   identify an object in an image that was generated by the camera, said identifying includes identifying a first set of key points of the object in two-dimensional (2D) space;
   generate a three-dimensional (3D) virtual object corresponding to the object, the 3D virtual object being associated with a second set of key points that represent an initial orientation of the 3D virtual object in 3D space, wherein the second set of key points define a polygon;
   rotate, in the 3D space, the second set of key points until a matched orientation is identified as between the rotated second set of key points in the 3D space and the first set of key points in the 2D space;
   determine that an orientation of the object, as represented in the 2D space, corresponds to the matched orientation that was determined by rotating the second set of key points in the 3D space; and
   based on the orientation of the object, determine an area of focus of the object in the 2D space.

18. The computer system of claim 1, wherein the first set of key points correspond to a skeleton representation.

19. The computer system of claim 1, wherein the first set of key points includes a ground point that contacts a ground.

20. The computer system of claim 1, wherein the second set of key points are rotated about a z-axis.

* * * * *